US012312930B2

(12) United States Patent
Cui et al.

(10) Patent No.: US 12,312,930 B2
(45) Date of Patent: May 27, 2025

(54) FRACTURING SYSTEM

(71) Applicant: YANTAI JEREH PETROLEUM EQUIPMENT & TECHNOLOGIES CO., LTD., Yantai (CN)

(72) Inventors: Shuzhen Cui, Yantai (CN); Rikui Zhang, Yantai (CN); Dong Liu, Yantai (CN); Jifeng Zhong, Yantai (CN); Liang Lv, Yantai (CN); Shouzhe Li, Yantai (CN); Yipeng Wu, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 18/643,904

(22) Filed: Apr. 23, 2024

(65) Prior Publication Data

US 2024/0271516 A1    Aug. 15, 2024

Related U.S. Application Data

(63) Continuation of application No. 17/887,931, filed on Aug. 15, 2022, now Pat. No. 12,173,594, which is a
(Continued)

(30) Foreign Application Priority Data

Jun. 13, 2019  (CN) .......................... 201910510411.8
Nov. 24, 2020  (CN) .......................... 202022752009.1

(51) Int. Cl.
*E21B 43/26*     (2006.01)
*F04B 17/03*     (2006.01)
*H02K 7/18*      (2006.01)

(52) U.S. Cl.
CPC .......... *E21B 43/2607* (2020.05); *F04B 17/03* (2013.01); *H02K 7/1823* (2013.01)

(58) Field of Classification Search
CPC ...... E21B 43/2607; F04B 17/03; F04B 47/02; H02K 7/1823
See application file for complete search history.

(56) References Cited

U.S. PATENT DOCUMENTS 1,711,979 A     5/1929   Helmut
2,015,745 A    10/1935   Max
(Continued)

FOREIGN PATENT DOCUMENTS

CA         2900387 A     10/2012
CA         2908276 A1     4/2016
(Continued)

OTHER PUBLICATIONS

Notice of Allowance for U.S. Appl. No. 18/066,499 mailed on Dec. 18, 2024.
(Continued)

*Primary Examiner* — Pedro J Cuevas
(74) *Attorney, Agent, or Firm* — Sheppard Mullin Richter & Hampton LLP

(57) ABSTRACT

The present disclosure provides a fracturing system comprising fracturing equipment. The fracturing equipment comprises a power supply platform, a gas turbine engine, one or more rectifiers, and a power system comprising at least one of the following: a generator, an energy storage, and an electricity supplier. At least two of the gas turbine engine, the power system, and the one or more rectifiers are arranged on the power supply platform. A first end of the power system is connected to the gas turbine engine. A second end of the power system is connected to the one or more rectifiers. The power system is configured to output a voltage to the one or more rectifiers directly without passing through a rectifier transformer.

20 Claims, 12 Drawing Sheets

Related U.S. Application Data continuation-in-part of application No. 17/747,916, filed on May 18, 2022, now Pat. No. 11,680,472, and a continuation-in-part of application No. 17/242,316, filed on Apr. 28, 2021, now Pat. No. 11,492,887, said application No. 17/747,916 is a continuation of application No. 17/167,391, filed on Feb. 4, 2021, now Pat. No. 12,078,044, and a continuation of application No. PCT/CN2020/137135, filed on Dec. 17, 2020, said application No. 17/242,316 is a continuation of application No. 16/834,446, filed on Mar. 30, 2020, now Pat. No. 11,035,214.

(56) References Cited

U.S. PATENT DOCUMENTS

| | | |
|---|---|---|
| 3,035,222 A | 5/1962 | Stone |
| 3,053,163 A | 9/1962 | Schofield |
| 3,378,755 A | 4/1968 | Sawyer |
| 3,453,443 A | 7/1969 | Stoeckly |
| 3,794,377 A | 2/1974 | Wachsmuth et al. |
| 3,815,965 A | 6/1974 | Ostwald |
| 4,136,432 A | 1/1979 | Melley, Jr. |
| 4,201,523 A | 5/1980 | Olofsson |
| 4,336,485 A | 6/1982 | Stroud |
| 4,720,645 A | 1/1988 | Stroud |
| 4,793,775 A | 12/1988 | Peruzzi |
| 4,904,841 A | 2/1990 | English |
| 4,908,538 A | 3/1990 | Geberth, Jr. |
| 4,992,669 A | 2/1991 | Parmley |
| 5,274,322 A | 12/1993 | Hayashi et al. |
| 5,282,722 A | 2/1994 | Beatty |
| 5,453,647 A | 9/1995 | Hedeen et al. |
| 5,517,822 A | 5/1996 | Haws et al. |
| 5,519,300 A | 5/1996 | Leon et al. |
| 5,614,799 A | 3/1997 | Anderson et al. |
| 5,691,590 A | 11/1997 | Kawai et al. |
| 5,714,821 A | 2/1998 | Dittman |
| 5,751,150 A | 5/1998 | Rippel et al. |
| 5,767,591 A | 6/1998 | Pinkerton |
| 5,821,660 A | 10/1998 | Anderson |
| 5,846,056 A | 12/1998 | Dhindsa et al. |
| 5,994,802 A | 11/1999 | Shichijyo et al. |
| 6,035,265 A | 3/2000 | Dister et al. |
| 6,121,707 A | 9/2000 | Bell et al. |
| 6,134,878 A | 10/2000 | Amako et al. |
| 6,281,610 B1 | 8/2001 | Kliman et al. |
| 6,331,760 B1 | 12/2001 | Mclane, Jr. |
| 6,388,869 B1 | 5/2002 | Fauteux et al. |
| 6,417,592 B2 | 7/2002 | Nakamura et al. |
| 6,450,133 B1 | 9/2002 | Bernard et al. |
| 6,455,974 B1 | 9/2002 | Fogarty |
| 6,552,463 B2 | 4/2003 | Oohashi et al. |
| 6,704,993 B2 | 3/2004 | Fogarty |
| 6,765,304 B2 | 7/2004 | Baten et al. |
| 6,784,583 B2 | 8/2004 | Umeda |
| 6,786,051 B2 | 9/2004 | Kristich et al. |
| 6,893,487 B2 | 5/2005 | Alger et al. |
| 6,895,903 B2 | 5/2005 | Campion |
| 7,007,966 B2 | 3/2006 | Campion |
| 7,016,207 B2 | 3/2006 | Yamanaka et al. |
| 7,036,310 B2 | 5/2006 | Aoki et al. |
| 7,075,206 B1 | 7/2006 | Chen |
| 7,081,682 B2 | 7/2006 | Campion |
| 7,112,891 B2 | 9/2006 | Johnson et al. |
| 7,122,913 B2 | 10/2006 | Witten et al. |
| 7,221,061 B2 | 5/2007 | Alger et al. |
| 7,245,032 B2 | 7/2007 | Willets et al. |
| 7,291,954 B2 | 11/2007 | Kashihara et al. |
| 7,372,174 B2 | 5/2008 | Jones et al. |
| 7,511,385 B2 | 3/2009 | Jones et al. |
| 7,608,934 B1 | 10/2009 | Hunter |
| 7,615,877 B2 | 11/2009 | Willets et al. |
| 7,619,319 B1 | 11/2009 | Hunter |
| 7,635,926 B2 | 12/2009 | Willets et al. |
| 7,656,052 B2 | 2/2010 | Jones et al. |
| 7,667,342 B2 | 2/2010 | Matsumoto et al. |
| 7,679,232 B2 | 3/2010 | Kakimoto et al. |
| 7,692,321 B2 | 4/2010 | Jones et al. |
| 7,708,538 B2 | 5/2010 | Kawabata et al. |
| 7,755,209 B2 | 7/2010 | Jones et al. |
| 7,921,914 B2 | 4/2011 | Bruins et al. |
| 8,159,082 B2 | 4/2012 | Gemin et al. |
| 8,294,285 B2 | 10/2012 | Hunter |
| 8,294,286 B2 | 10/2012 | Hunter |
| 8,362,638 B2 | 1/2013 | Gemin et al. |
| 8,459,958 B2 | 6/2013 | Renner |
| 8,495,869 B2 | 7/2013 | Beissler et al. |
| 8,519,591 B2 | 8/2013 | Nishimura |
| 8,587,136 B2 | 11/2013 | Williams |
| 8,670,260 B2 | 3/2014 | Wang et al. |
| 8,731,793 B2 | 5/2014 | Barbir et al. |
| 8,773,876 B2 | 7/2014 | Kuboyama et al. |
| 8,788,161 B2 | 7/2014 | Hofig et al. |
| 8,789,601 B2 | 7/2014 | Broussard et al. |
| 8,796,899 B2 | 8/2014 | Imazawa et al. |
| 8,811,048 B2 | 8/2014 | Zhang et al. |
| 8,937,415 B2 | 1/2015 | Shimono |
| 9,103,193 B2 | 8/2015 | Coli et al. |
| 9,140,110 B2 | 9/2015 | Coli et al. |
| 9,166,495 B2 | 10/2015 | Guan |
| 9,209,704 B2 | 12/2015 | Huang |
| 9,316,676 B2 | 4/2016 | Dayan |
| 9,534,473 B2 | 1/2017 | Morris et al. |
| 9,562,420 B2 | 2/2017 | Morris et al. |
| 9,577,545 B2 | 2/2017 | Tan et al. |
| 9,641,112 B2 | 5/2017 | Harknett et al. |
| 9,863,476 B2 | 1/2018 | Gray et al. |
| 10,184,397 B2 | 1/2019 | Austin et al. |
| 10,240,643 B2 | 3/2019 | Clapp et al. |
| 10,411,635 B2 | 9/2019 | Takahashi |
| 10,514,205 B2 | 12/2019 | Hjorth et al. |
| 10,523,130 B2 | 12/2019 | Bax et al. |
| 10,584,671 B2 | 3/2020 | Tunzini et al. |
| 10,610,842 B2 | 4/2020 | Chong |
| 10,648,311 B2 | 5/2020 | Oehring et al. |
| 10,801,311 B1 | 10/2020 | Cui et al. |
| 10,855,142 B2 | 12/2020 | Cory |
| 10,865,624 B1 | 12/2020 | Cui et al. |
| 10,873,099 B1 | 12/2020 | Gurunathan et al. |
| 10,914,155 B2 * | 2/2021 | Oehring ............... B01D 46/003 |
| 10,989,180 B2 * | 4/2021 | Yeung ................... F04B 17/05 |
| 11,035,214 B2 | 6/2021 | Cui et al. |
| 11,047,379 B1 | 6/2021 | Li et al. |
| 11,109,508 B1 | 8/2021 | Yeung et al. |
| 11,125,066 B1 | 9/2021 | Yeung et al. |
| 11,162,484 B2 | 11/2021 | Peotter et al. |
| 11,208,878 B2 * | 12/2021 | Oehring .................. H01F 27/02 |
| 11,220,895 B1 | 1/2022 | Yeung et al. |
| 11,236,739 B2 * | 2/2022 | Yeung .................... H02J 9/062 |
| 11,280,253 B2 | 3/2022 | Morris |
| 11,378,008 B2 | 7/2022 | Yeung et al. |
| 11,391,136 B2 | 7/2022 | Coli et al. |
| 11,434,737 B2 | 9/2022 | Oehring et al. |
| 11,459,863 B2 * | 10/2022 | Robinson ............... E21B 43/127 |
| 11,530,602 B2 * | 12/2022 | Yeung .................... H02J 9/066 |
| 11,542,786 B2 | 1/2023 | Hinderliter et al. |
| 11,578,580 B2 * | 2/2023 | Oehring ................. F04B 17/03 |
| 11,592,020 B2 | 2/2023 | Chang et al. |
| 11,629,584 B2 * | 4/2023 | Yeung .................... H02J 9/066 |
| | | 166/308.1 |
| 11,680,474 B2 | 6/2023 | Cui et al. |
| 11,746,636 B2 | 9/2023 | Zhong et al. |
| 11,859,482 B2 * | 1/2024 | Yeung .................... F04B 23/06 |
| 11,952,996 B2 | 4/2024 | Oehring et al. |
| 11,982,169 B2 | 5/2024 | Cui et al. |
| 12,065,968 B2 * | 8/2024 | Yeung .................... F02C 7/055 |
| 12,084,952 B2 * | 9/2024 | Robinson ............... E21B 43/127 |
| 12,116,875 B2 * | 10/2024 | Oehring ................. F04B 23/06 |
| 2003/0007369 A1 | 1/2003 | Gilbreth et al. |
| 2003/0030246 A1 | 2/2003 | Campion |
| 2003/0033994 A1 | 2/2003 | Campion |
| 2003/0057704 A1 | 3/2003 | Baten et al. |
| 2003/0064858 A1 | 4/2003 | Saeki et al. |

(56) References Cited

U.S. PATENT DOCUMENTS

| | | |
|---|---|---|
| 2003/0079479 A1 | 5/2003 | Kristich et al. |
| 2004/0081561 A1 | 4/2004 | Iwanami et al. |
| 2004/0104577 A1 | 6/2004 | Alger et al. |
| 2004/0174723 A1 | 9/2004 | Yamanaka et al. |
| 2004/0182652 A1 | 9/2004 | Ammon et al. |
| 2005/0093496 A1 | 5/2005 | Tokunou et al. |
| 2005/0241884 A1 | 11/2005 | Ghanemi et al. |
| 2006/0066105 A1 | 3/2006 | Johnson et al. |
| 2006/0066108 A1 | 3/2006 | Willets et al. |
| 2006/0080971 A1 | 4/2006 | Smith et al. |
| 2006/0208594 A1 | 9/2006 | Kashihara et al. |
| 2006/0260331 A1 | 11/2006 | Andreychuk |
| 2007/0108771 A1 | 5/2007 | Jones et al. |
| 2007/0121354 A1 | 5/2007 | Jones et al. |
| 2007/0216452 A1 | 9/2007 | Matsumoto et al. |
| 2007/0273220 A1 | 11/2007 | Koyama et al. |
| 2009/0146426 A1 | 6/2009 | Jones et al. |
| 2009/0146500 A1 | 6/2009 | Jones et al. |
| 2009/0147549 A1 | 6/2009 | Jones et al. |
| 2009/0308602 A1 | 12/2009 | Bruins et al. |
| 2010/0045237 A1 | 2/2010 | Liu |
| 2010/0060076 A1 | 3/2010 | Gemin et al. |
| 2010/0084922 A1 | 4/2010 | Gollentz et al. |
| 2010/0135840 A1 | 6/2010 | Fujimoto et al. |
| 2011/0061411 A1 | 3/2011 | Kim et al. |
| 2012/0002454 A1 | 1/2012 | Kuboyama et al. |
| 2012/0065787 A1 | 3/2012 | Broniak et al. |
| 2012/0153935 A1 | 6/2012 | Gao et al. |
| 2012/0175947 A1 | 7/2012 | Gemin et al. |
| 2012/0248922 A1 | 10/2012 | Imazawa et al. |
| 2012/0255734 A1 | 10/2012 | Coli et al. |
| 2012/0292992 A1 | 11/2012 | Williams |
| 2012/0326668 A1 | 12/2012 | Ballatine et al. |
| 2013/0030742 A1 | 1/2013 | Banerjee et al. |
| 2013/0049733 A1 | 2/2013 | Neti et al. |
| 2013/0063070 A1 | 3/2013 | Zhang et al. |
| 2013/0119832 A1 | 5/2013 | Nagao et al. |
| 2013/0182468 A1 | 7/2013 | Guan |
| 2013/0184884 A1 | 7/2013 | More et al. |
| 2013/0228345 A1 | 9/2013 | Aho et al. |
| 2013/0229836 A1 | 9/2013 | Wang et al. |
| 2013/0234522 A1 | 9/2013 | Tan et al. |
| 2013/0255153 A1 | 10/2013 | Sasaki et al. |
| 2013/0306322 A1 | 11/2013 | Sanborn et al. |
| 2014/0049285 A1 | 2/2014 | Rodriguez |
| 2014/0096974 A1 | 4/2014 | Coli et al. |
| 2014/0138079 A1 | 5/2014 | Broussard et al. |
| 2014/0167810 A1 | 6/2014 | Neti et al. |
| 2014/0174717 A1 | 6/2014 | Broussard et al. |
| 2014/0210213 A1 | 7/2014 | Campion et al. |
| 2014/0219824 A1 | 8/2014 | Burnette |
| 2014/0239858 A1 | 8/2014 | Bertotto et al. |
| 2014/0312823 A1 | 10/2014 | Huang |
| 2015/0027712 A1 | 1/2015 | Vicknair et al. |
| 2015/0061383 A1 | 3/2015 | Kobayashi |
| 2015/0068754 A1 | 3/2015 | Coli et al. |
| 2015/0114652 A1 | 4/2015 | Lestz et al. |
| 2015/0252661 A1 | 9/2015 | Glass |
| 2015/0260794 A1 | 9/2015 | Athikessavan et al. |
| 2015/0300145 A1 | 10/2015 | Coli et al. |
| 2015/0314255 A1 | 11/2015 | Coli et al. |
| 2015/0349387 A1 | 12/2015 | Inaba et al. |
| 2016/0041066 A1 | 2/2016 | Patenaude et al. |
| 2016/0075387 A1 | 3/2016 | Fong et al. |
| 2016/0105022 A1 | 4/2016 | Oehring et al. |
| 2016/0121871 A1 | 5/2016 | Lee |
| 2016/0177675 A1 | 6/2016 | Morris et al. |
| 2016/0177678 A1 | 6/2016 | Morris et al. |
| 2016/0177945 A1 | 6/2016 | Byrne et al. |
| 2016/0215769 A1 | 7/2016 | Haapanen et al. |
| 2016/0273328 A1 | 9/2016 | Oehring |
| 2016/0348479 A1 | 12/2016 | Oehring et al. |
| 2016/0358311 A1 | 12/2016 | Chen et al. |
| 2016/0369609 A1 | 12/2016 | Morris et al. |
| 2017/0051732 A1 | 2/2017 | Hemandez et al. |
| 2017/0104389 A1 | 4/2017 | Morris et al. |
| 2017/0154387 A1 | 6/2017 | Somers |
| 2017/0159425 A1 | 6/2017 | Wood et al. |
| 2017/0222409 A1 | 8/2017 | Oehring et al. |
| 2017/0285062 A1 | 10/2017 | Kim |
| 2017/0288565 A1 | 10/2017 | Bethke et al. |
| 2017/0292789 A1 | 10/2017 | Hjorth et al. |
| 2017/0302135 A1 | 10/2017 | Cory |
| 2017/0305284 A1 | 10/2017 | Koh et al. |
| 2018/0059754 A1 | 3/2018 | Shaikh et al. |
| 2018/0080376 A1 | 3/2018 | Austin et al. |
| 2018/0080377 A1 | 3/2018 | Austin et al. |
| 2018/0135617 A1 | 5/2018 | Ma et al. |
| 2018/0145511 A1 | 5/2018 | Biellmann |
| 2018/0156210 A1 | 6/2018 | Oehring et al. |
| 2018/0159403 A1 | 6/2018 | Yokoyama et al. |
| 2018/0326337 A1 | 11/2018 | Esenwein et al. |
| 2018/0328157 A1 | 11/2018 | Bishop |
| 2018/0335096 A1 | 11/2018 | Kim et al. |
| 2019/0010793 A1 | 1/2019 | Hinderliter |
| 2019/0100989 A1 | 4/2019 | Stewart et al. |
| 2019/0128265 A1 | 5/2019 | Washio et al. |
| 2019/0136840 A1 | 5/2019 | Kumar et al. |
| 2019/0157982 A1 | 5/2019 | Brueckner et al. |
| 2019/0169971 A1 | 6/2019 | Oehring et al. |
| 2019/0195292 A1 | 6/2019 | Pan et al. |
| 2019/0229643 A1 | 7/2019 | Bax et al. |
| 2019/0319459 A1 | 10/2019 | Brathwaite et al. |
| 2019/0331080 A1 | 10/2019 | Tunzini et al. |
| 2020/0040705 A1 | 2/2020 | Morris et al. |
| 2020/0040878 A1 | 2/2020 | Morris |
| 2020/0049136 A1 | 2/2020 | Stephenson |
| 2020/0109616 A1* | 4/2020 | Oehring ............... F04B 17/03 |
| 2020/0109617 A1* | 4/2020 | Oehring ............... H02B 13/00 |
| 2020/0270948 A1 | 8/2020 | Kothuru et al. |
| 2020/0300246 A1 | 9/2020 | Sadakata et al. |
| 2020/0325760 A1 | 10/2020 | Markham |
| 2020/0332784 A1 | 10/2020 | Zhang et al. |
| 2020/0378232 A1 | 12/2020 | Sharp et al. |
| 2021/0040830 A1 | 2/2021 | Mu et al. |
| 2021/0040836 A1 | 2/2021 | Baskin |
| 2021/0079902 A1* | 3/2021 | Yeung ................. F04B 53/18 |
| 2021/0095552 A1 | 4/2021 | Oehring et al. |
| 2021/0095648 A1 | 4/2021 | Buckley et al. |
| 2021/0102451 A1* | 4/2021 | Robinson ............. E21B 43/17 |
| 2021/0102530 A1 | 4/2021 | Pruitt et al. |
| 2021/0107616 A1 | 4/2021 | Pedersen |
| 2021/0108489 A1 | 4/2021 | Shampine |
| 2021/0199161 A1 | 7/2021 | Eto et al. |
| 2021/0207588 A1* | 7/2021 | Yeung ................. H02J 9/066 |
| 2021/0301630 A1 | 9/2021 | Krippner et al. |
| 2021/0310341 A1 | 10/2021 | Sherman et al. |
| 2021/0355802 A1 | 11/2021 | Yeung et al. |
| 2021/0396120 A1 | 12/2021 | Rother et al. |
| 2022/0004179 A1 | 1/2022 | Badkoubeh |
| 2022/0018232 A1* | 1/2022 | Oehring ............... F04B 23/06 |
| 2022/0112889 A1* | 4/2022 | Yeung ................. F16N 19/006 |
| 2022/0112892 A1 | 4/2022 | Cui et al. |
| 2022/0213777 A1 | 7/2022 | Cui et al. |
| 2022/0298906 A1 | 9/2022 | Zhong et al. |
| 2022/0333471 A1 | 10/2022 | Zhong et al. |
| 2022/0364448 A1* | 11/2022 | Oehring ............... H02B 13/00 |
| 2023/0055844 A1* | 2/2023 | Yeung ................. H02J 9/062 |
| 2023/0146951 A1* | 5/2023 | Robinson ............. E21B 43/127 |
| | | 166/308.1 |
| 2023/0203927 A1* | 6/2023 | Yeung ................. F04B 17/05 |
| | | 166/308.1 |
| 2023/0272699 A1* | 8/2023 | Oehring ............... B01D 46/003 |
| 2023/0296050 A1* | 9/2023 | Yeung ................. F02C 6/00 |
| | | 62/317 |
| 2024/0084680 A1* | 3/2024 | Robinson ............. E21B 43/17 |
| 2024/0093583 A1* | 3/2024 | Yeung ................. H02J 9/06 |
| 2024/0295191 A1* | 9/2024 | Yeung ................. F01D 25/28 |
| 2024/0392666 A1* | 11/2024 | Robinson ............. E21B 43/2607 |

FOREIGN PATENT DOCUMENTS

| | | |
|---|---|---|
| CN | 1154765 A | 7/1997 |
| CN | 100999188 A | 7/2007 |

(56) References Cited

FOREIGN PATENT DOCUMENTS

| | | |
|---|---|---|
| CN | 101636901 A | 1/2010 |
| CN | 101639040 A | 2/2010 |
| CN | 201461291 U | 5/2010 |
| CN | 101728860 A | 6/2010 |
| CN | 201549965 U | 8/2010 |
| CN | 201570910 U | 9/2010 |
| CN | 201953368 U | 8/2011 |
| CN | 102494894 A | 6/2012 |
| CN | 102574475 A | 7/2012 |
| CN | 102602322 A | 7/2012 |
| CN | 102704895 A | 10/2012 |
| CN | 202544830 U | 11/2012 |
| CN | 102810909 A | 12/2012 |
| CN | 202645914 U | 1/2013 |
| CN | 103089226 A | 5/2013 |
| CN | 103310963 A | 9/2013 |
| CN | 103456141 A | 12/2013 |
| CN | 103770852 A | 5/2014 |
| CN | 103913193 A | 7/2014 |
| CN | 104033247 A | 9/2014 |
| CN | 104578389 A | 4/2015 |
| CN | 204386465 U | 6/2015 |
| CN | 204402781 U | 6/2015 |
| CN | 105020343 A | 11/2015 |
| CN | 105337397 A | 2/2016 |
| CN | 105352588 A | 2/2016 |
| CN | 105545622 A | 5/2016 |
| CN | 105763337 A | 7/2016 |
| CN | 205479153 U | 8/2016 |
| CN | 105973621 A | 9/2016 |
| CN | 106143468 A | 11/2016 |
| CN | 106711990 A | 5/2017 |
| CN | 107208557 A | 9/2017 |
| CN | 107231000 A | 10/2017 |
| CN | 107237617 A | 10/2017 |
| CN | 107240915 A | 10/2017 |
| CN | 107345857 A | 11/2017 |
| CN | 107816341 A | 3/2018 |
| CN | 207652040 U | 7/2018 |
| CN | 108360818 A | 8/2018 |
| CN | 108442912 A | 8/2018 |
| CN | 108443099 A | 8/2018 |
| CN | 207829871 U | 9/2018 |
| CN | 108900136 A | 11/2018 |
| CN | 208281489 U | 12/2018 |
| CN | 208283527 U | 12/2018 |
| CN | 208337176 U | 1/2019 |
| CN | 109296733 A | 2/2019 |
| CN | 109572449 A | 4/2019 |
| CN | 109578459 A | 4/2019 |
| CN | 109765484 A | 5/2019 |
| CN | 208924123 U | 5/2019 |
| CN | 109869294 A | 6/2019 |
| CN | 109882144 A | 6/2019 |
| CN | 209041375 U | 6/2019 |
| CN | 110107490 A | 8/2019 |
| CN | 110118127 A | 8/2019 |
| CN | 110152552 A | 8/2019 |
| CN | 110155193 A | 8/2019 |
| CN | 110252191 A | 9/2019 |
| CN | 110374164 A | 10/2019 |
| CN | 209469732 U | 10/2019 |
| CN | 110454285 A | 11/2019 |
| CN | 110513097 A | 11/2019 |
| CN | 110794032 A | 2/2020 |
| CN | 110821464 A | 2/2020 |
| CN | 210105993 U | 2/2020 |
| CN | 110932362 A | 3/2020 |
| CN | 210183018 U | 3/2020 |
| CN | 111043023 A | 4/2020 |
| CN | 210273758 U | 4/2020 |
| CN | 111156266 A | 5/2020 |
| CN | 111173500 A | 5/2020 |
| CN | 111181159 A | 5/2020 |
| CN | 210745048 U | 6/2020 |
| CN | 210780534 U | 6/2020 |
| CN | 210888905 U | 6/2020 |
| CN | 210889387 U | 6/2020 |
| CN | 109578459 B | 7/2020 |
| CN | 111502974 A | 8/2020 |
| CN | 111525736 A | 8/2020 |
| CN | 211201920 U | 8/2020 |
| CN | 111628519 A | 9/2020 |
| CN | 111650514 A | 9/2020 |
| CN | 111679187 A | 9/2020 |
| CN | 211530941 U | 9/2020 |
| CN | 111769551 A | 10/2020 |
| CN | 111799903 A | 10/2020 |
| CN | 211819660 U | 10/2020 |
| CN | 112127863 A | 12/2020 |
| CN | 112311297 A | 2/2021 |
| CN | 112383190 A | 2/2021 |
| CN | 112467899 A | 3/2021 |
| CN | 212649313 U | 3/2021 |
| CN | 212671744 U | 3/2021 |
| CN | 212749608 U | 3/2021 |
| CN | 213027453 U | 4/2021 |
| CN | 112983381 A | 6/2021 |
| CN | 112983382 A | 6/2021 |
| CN | 112993965 A | 6/2021 |
| CN | 113006757 A | 6/2021 |
| CN | 113417737 A | 9/2021 |
| CN | 214227909 U | 9/2021 |
| CN | 113513462 A | 10/2021 |
| CN | 214330604 U | 10/2021 |
| CN | 214741267 U | 11/2021 |
| CN | 214786070 U | 11/2021 |
| CN | 215292784 U | 12/2021 |
| CN | 215621353 U | 1/2022 |
| CN | 114109335 A | 3/2022 |
| CN | 114553062 A | 5/2022 |
| DE | 102013208455 A1 | 11/2014 |
| EP | 2290776 A1 | 3/2011 |
| JP | 4096267 B2 | 6/2008 |
| KR | 20110045161 A | 5/2011 |
| KR | 20210087308 A | 7/2021 |
| RU | 163399 U1 | 7/2016 |
| RU | 178973 U1 | 4/2018 |
| WO | 2009046280 A1 | 4/2009 |
| WO | 2015/030757 A1 | 3/2015 |
| WO | 2018/025891 A1 | 2/2018 |
| WO | 2020139630 A1 | 7/2020 |

OTHER PUBLICATIONS

Notice of Allowance for U.S. Appl. No. 17/493,573 mailed on Oct. 17, 2024.
Third Office Action for Chinese Application No. 202110426356.1 mailed on Oct. 13, 2024. English machine translation provided.
Search Report for Chinese Application No. 202110426356.1 mailed on Oct. 14, 2024. English machine translation provided.
Deng et al., "Safety evaluation of BY610Z hydraulic transmission for coal mine underground fracturing pump unit", Jun. 15, 2019. English Machine translation of the abstract provided.
Notice of Allowance for U.S. Appl. No. 18/348,761 mailed on Oct. 21, 2024.
Final Office Action for U.S. Appl. No. 17/559,522 mailed on Nov. 21, 2024.
Rejection Decision for Chinese Application No. 201911043619.X mailed on Nov. 18, 2024.
Supplemental Search Report for Chinese Application No. 201911043619.X mailed on Nov. 5, 2024.
Feng et al., "Well Repair Volume 2", Nov. 30, 1988. English abstract provided.
Second Office Action for Chinese Application No. 202011273318.9 mailed on Nov. 18, 2024.
Supplemental Search Report for Chinese Application No. 202011273318.9 mailed on Oct. 30, 2024.
Notice of Allowance for U.S. Appl. No. 18/311,042 mailed on Sep. 27, 2024.

(56) References Cited

OTHER PUBLICATIONS

First Office Action for Chinese Application No. 202011273318.9 mailed on Sep. 2, 2024.
First Search for Chinese Application No. 202011273318.9 mailed on Aug. 27, 2024.
International Preliminary Report on Patentability Chapter I for International Application No. PCT/CN2022/076321 mailed on Aug. 29, 2024.
Notice of Allowance for U.S. Appl. No. 17/774,815 mailed on Sep. 30, 2024.
Office Action for Candian Application No. 3173692 mailed on Aug. 16, 2024.
Non-Final Office Action for U.S. Appl. No. 18/629,003 mailed on Oct. 7, 2024.
Non-Final Office Action for U.S. Appl. No. 17/493,573 mailed on Jul. 5, 2024.
International Preliminary Report on Patentability Chapter I for PCT Application No. PCT/CN2022/076452 mailed on Aug. 29, 2024.
Notice of Allowance for U.S. Appl. No. 17/774,795 mailed on Sep. 20, 2024.
Notice of Allowance for Canadian Application No. 3159593 mailed on Jun. 14, 2024.
Notice of Allowance for U.S. Appl. No. 18/360,678 mailed on Aug. 20, 2024.
Notice of Allowance for U.S. Appl. No. 18/313,088 mailed on Aug. 23, 2024.
Notice of Allowance for U.S. Appl. No. 18/303,181 mailed on Aug. 21, 2024.
Non-Final Office Action for U.S. Appl. No. 18/066,499 mailed on Aug. 15, 2024.
Second Office Action for Chinese Application No. 201911043619.X mailed on Jul. 31, 2024.
Non-Final Office Action for U.S. Appl. No. 17/559,522 mailed on Aug. 2, 2024.
Written Opinion and International Search Report for PCT Application No. PCT/CN2021/139240 mailed on Mar. 16, 2022.
Written Opinion and International Search Report for PCT Application No. PCT/CN2021/113988 mailed on Apr. 28, 2022.
Written Opinion of the International Searching Authority and International Search Report for PCT Application No. PCT/CN2019/102811 mailed on Mar. 19, 2020.
International Preliminary Report on Patentability Chapter I for PCT Application No. PCT/CN2019/102811 mailed on Dec. 23, 2021.
Non-Final Office Action for U.S. Appl. No. 16/834,446 mailed on Jun. 5, 2020.
Non-Final Office Action for U.S. Appl. No. 16/834,446 mailed on Jan. 6, 2021.
Non-Final Office Action for U.S. Appl. No. 17/242,316 mailed on May 26, 2022.
Search Report for Chinese Application No. 202110455679.3 mailed on May 28, 2022.
Written Opinion and International Search Report for PCT Application No. PCT/CN2022/076452 mailed on Jun. 1, 2022.
Non-Final Office Action for U.S. Appl. No. 17/728,667 mailed on Sep. 16, 2022.
Written Opinion and International Search Report for PCT Application No. PCT/CN2021/132090 mailed on Jul. 7, 2022.
First Search for Chinese Application No. 202280000733.8 mailed on Mar. 14, 2023.
Written Opinion and International Search Report for PCT Application No. PCT/CN2022/101889 mailed on Sep. 7, 2022.
First Search Report for Chinese Application No. 202111198446.6 mailed on Mar. 15, 2023.
Search Report for Chinese Application No. 202111198446.6 mailed on May 25, 2023.
Non-Final Office Action for U.S. Appl. No. 18/303,181 mailed on Apr. 30, 2024.
Non-Final Office Action for U.S. Appl. No. 18/313,088 mailed on Mar. 28, 2024.

Non-Final Office Action for U.S. Appl. No. 18/360,678 mailed on Feb. 28, 2024.
First Search for Chinese Application No. 202110426356.1 mailed on Dec. 3, 2023.
Deng, "Safety Evaluation of BY610Z Hydraulic Transmission Used in Underground Fracturing Pump Unit of Coal Mine," Jun. 15, 2019, Abstract provided.
Office Action for Russian Application No. 2022132812 mailed on May 22, 2023.
Office Action for Russian Application No. 2022132812 mailed on Dec. 19, 2023.
Final Office Action for U.S. Appl. No. 17/493,573 mailed on Jul. 5, 2024.
Non-Final Office Action for U.S. Appl. No. 17/774,815 mailed on Jun. 18, 2024.
Examination Report for Canadian Patent Application No. 3157232 mailed on Jun. 20, 2024.
First Office Action for Chinese Application No. 201911044083.3 mailed on Jun. 25, 2024.
First Search for Chinese Application No. 2019110440833 mailed on Jun. 21, 2024.
Li et al., "Development of YLC50-1340 special fracturing truck for coal bed methane," China Petroleum Machinery, Sep. 19, 2011 with English abstract.
Final Office Action for U.S. Appl. No. 17/559,522 mailed on Mar. 25, 2024.
First Search for Chinese Application No. 201911043619.X mailed on Feb. 1, 2024.
Non-Final Office Action for U.S. Appl. No. 17/559,522 mailed on Dec. 19, 2023.
Requirement for Restriction/Election for U.S. Appl. No. 17/559,522 mailed on Sep. 20, 2023.
First Search for Chinese Application No. 201910510411.8 mailed on Oct. 10, 2023.
Non-Final Office Action for U.S. Appl. No. 17/693,170 mailed on Aug. 29, 2023.
Written Opinion of the International Searching Authority and International Search Report for PCT Application No. PCT/CN2019/114303 mailed on Aug. 3, 2020.
"Kilowatts to horsepower conversion," RapidTables, retrieved from: https://www.rapidtables.com/convert/power/kw-to-hp.html— Kilowatts to horsepower (hp) conversion calculator, retrieved on May 6, 2020.
Quintuplex—PowerZone, retrieved from: https://www.powerzone.com/resources/glossary/quintuplex#:-:text=A%20reciprocating%20pump%20design%20which,pump%20used%20across%20many%20industries.&text=Dual%20action%20quintuplex%20pumps%20can,rare%20and%20usually%20custom%20manufactured, retrieved on Aug. 18, 2020.
Final Office Action for U.S. Appl. No. 16/833,496 mailed on Aug. 28, 2020.
Non-Final Office Action for U.S. Appl. No. 16/833,496 mailed on May 12, 2020.
Non-Final Office Action for U.S. Appl. No. 16/832,872 mailed on Jun. 11, 2020.
Final Office Action for U.S. Appl. No. 16/832,872 mailed on Oct. 9, 2020.
Written Opinion of the International Search Authority and International Search Report for PCT Application No. PCT/CN2019/114304 mailed on Jul. 29, 2020.
International Preliminary Report on Patentability Chapter I for PCT Application No. PCT/CN2019/114304 mailed on May 12, 2022.
Written Opinion of the International Search Authority and International Search Report dated Sep. 2, 2021, for International Application No. PCT/CN2020/135860, 4 pages.
Non-Final Office Action for U.S. Appl. No. 17/170,141 mailed on Feb. 8, 2021.
Final Office Action for U.S. Appl. No. 17/170,141 mailed on Aug. 5, 2022.
Non-Final Office Action for U.S. Appl. No. 17/733,922 mailed on Sep. 21, 2022.
Non-Final Office Action for U.S. Appl. No. 17/884,358 mailed on Dec. 8, 2022.

(56) References Cited

OTHER PUBLICATIONS

Final Office Action for U.S. Appl. No. 17/733,922 mailed on Dec. 28, 2022.
Notice of Allowance for U.S. Appl. No. 17/884,358 mailed on Feb. 8, 2023.
Non-Final Office Action for U.S. Appl. No. 17/155,966 mailed on Jul. 28, 2022.
Non-Final Office Action for U.S. Appl. No. 17/747,916 mailed on Aug. 18, 2022.
International Search Report dated Aug. 23, 2021, for International Application No. PCT/CN2020/137135.
Written Opinion and International Search Report dated Aug. 13, 2021, for International Application No. PCT/CN2020/137300.
Final Office Action for U.S. Appl. No. 17/747,916 mailed on Nov. 10, 2022.
Written Opinion and International Search Report for PCT Application No. PCT/CN2022/076321 mailed on Nov. 16, 2022.
Non-Final Office Action for U.S. Appl. No. 17/167,391 mailed on Feb. 17, 2023.
First Office Action for Chinese Application No. 202110864527.9 mailed on Dec. 24, 2025. [ ** new].
Second Office Action for Chinese Application No. 201911044083.3 mailed on Dec. 27, 2024.
Shi et al., "Oilfield Power Grid Planning and Design", Mar. 31, 2011. English machine translation provided.
Third Office Action for Chinese Application No. 202011273318.9 mailed on Feb. 8, 2025.
Fourth Office Action for Chinese Application No. 202110426356. 1 mailed on Jan. 11, 2025.
Notice of Allowance for U.S. Appl. No. 17/559,522 mailed on Jan. 29, 2025.
Notice of Allowance for U.S. Appl. No. 18/629,003 mailed on Feb. 20, 2025.
Rejection Decision for Chinese Application No. 202110426356.1 mailed on Mar. 26, 2025.
Rejection Decision for Chinese Application No. 202011273318.9 mailed on Apr. 16, 2025.
Third Office Action for Chinese Application No. 201911044083.3 mailed on Apr. 18, 2025.
First Office Action for Chinese Application No. 202310409373.3 mailed on Apr. 11, 2025.

\* cited by examiner

920

---

921 controlling an energy storage to supply electrical energy to fracturing equipment when power supply from an electricity supplier is cut off, wherein: the fracturing equipment comprises a power supply platform, a gas turbine engine, one or more rectifiers, and a power system comprising at least one of the following: a generator, the energy storage, and the electricity supplier; at least two of the gas turbine engine, the power system, and the one or more rectifiers are arranged on the power supply platform; a first end of the power system is connected to the gas turbine engine; a second end of the power system is connected to the one or more rectifiers; and the power system is configured to output a voltage to the one or more rectifiers directly without passing through a rectifier transformer

922 controlling the energy storage to charge a portion of batteries of the energy storage and supply electrical energy from a different portion of the batteries of the energy storage at the same time

FIG. 21

FRACTURING SYSTEM

CROSS-REFERENCE TO RELATED APPLICATIONS

The present application is a continuation of U.S. patent application Ser. No. 17/887,931 filed on Aug. 15, 2022, which is a continuation-in-part of U.S. patent application Ser. No. 17/242,316 filed on Apr. 28, 2021, which is a continuation of U.S. patent application Ser. No. 16/834,446 filed on Mar. 30, 2020. U.S. patent application Ser. No. 16/834,446 claims priority to Chinese Patent Application No. 201910510411.8 filed on Jun. 13, 2019. U.S. patent application Ser. No. 17/887,931 is also a continuation-in-part of U.S. patent application Ser. No. 17/747,916 filed on May 18, 2022, which is a continuation application of U.S. patent application Ser. No. 17/167,391 filed on Feb. 4, 2021. U.S. patent application Ser. No. 17/167,391 claims priority to Chinese Patent Application No. 202022752009.1, filed on Nov. 24, 2020. U.S. patent application Ser. No. 17/747,916 is also a continuation application of International Application No. PCT/CN2020/137135 filed on Dec. 17, 2020, which claims priority to Chinese Patent Application No. 202022752009.1 filed on Nov. 24, 2020. The entire contents of all of the above-identified applications are incorporated herein by reference in their entirety.

FIELD OF INVENTION

The present disclosure generally relates to a fracturing system.

BACKGROUND

Fracturing is a major measure for stimulating oilfield productions. In a configuration mode of a power transmission system used in conventional fracturing equipment on fracturing sites in oil and gas fields all over the world, a diesel engine is connected to a transmission to drive a fracturing plunger pump through a transmission shaft to work. This configuration mode has the following disadvantages: (1) Large volume and heavy weight: When the diesel engine drives the transmission to drive the fracturing plunger pump through the transmission shaft, a large volume is occupied, a heavy weight is involved, the transportation is restricted, and the power density is low. (2) Environmental problems: During operations on a well site, the fracturing equipment driven by the diesel engine would generate engine waste gas pollution and noise pollution. The noise exceeding 105 dBA will severely affect the normal life of nearby residents. (3) Cost inefficiency: The fracturing equipment driven by the diesel engine requires relatively high initial purchase costs and incurs high fuel consumption costs for unit power during operation, and the engine and the transmission also require very high routine maintenance costs. Efforts are made globally to manufacture oil-gas exploitation equipment with "low energy consumption, low noise, and low emission". Therefore, the foregoing disadvantages of conventional fracturing equipment that uses the diesel engine as the power source impedes the exploitation progress of unconventional oil and gas sources to some extent.

Limited by issues such as construction cost and environmental pollution, electrical equipment has been gradually applied to provide driving force for oilfield site construction, that is, electric driving fracturing construction. For example, the fracturing system can be connected to and powered by electricity grid; or electricity generating equipment can be mounted on site to supply electrical energy; or both the electricity grid and the electricity generating equipment can be jointly applied to supply combined electrical energy to the fracturing system.

However, there are still the following problems in fracturing operation using electric drive:

1. At present, gas turbines are widely used to drive generators for electricity generation, which has high thermal efficiency and good economy. However, gas turbines usually need to be equipped with black-start devices to start the generator. Multiple black-starts (usually power equipment driven by diesel engines) are required when there are multiple generators, leading to redundancy of start devices. In addition, diesel fuel is also required. These problems increase variety and complexity of equipment at the well site.
2. The scale of fracturing operation is usually large. For example, the power of shale gas fracturing can usually reach 20,000-50,000 WHP. If all equipment is driven by electrical energy, power about 25 MW is needed. Therefore, it is necessary to ensure sufficient generator power. The placement of gas treatment equipment should also be considered when arranging electricity generating equipment at the well site. Considering safety problems (such as operation failure caused by abnormal power failure, which leads to failure of expected effect, even safety accidents), it is also necessary to arrange backup electricity generating equipment. All of these conditions result in a relatively large area occupied by electricity generating equipment. In addition, flattening ground is needed to arrange electricity generating equipment, however, most well sites are located in the wild, even in mountains, where flattening ground needs additional cost to obtain This further increases the cost of fracturing operations.
3. Fracturing operation site usually keeps continuous high-power operations lasting about 2-4 hours. In the clearance period, inspection, wellhead switching, perforation and other work are performed, then high-power operations are performed again. In other words, the electric load of fracturing operation fluctuates greatly. If the generator set is kept idling during the clearance period when almost no electrical energy is needed, it will cause a waste of fuel. Otherwise, if some or all of the generators are started and stopped frequently along with the fracturing construction process, it may lead to high cost and reduction of the generator's service life.
4. There are limitations to the power of a single generator. For example, when operating at a high temperature the electricity generation capacity of the gas turbine will decrease. Therefore, overload risks may occur to electricity generating equipment at the well site under some working conditions.
5. Fuel supply issues should be usually considered when electricity generating equipment is driven by internal combustion engines. The consumption of liquid or gas fuel is large. Although multiple generators can be backed up, fuel supply systems and pipelines are usually unable or difficult to be backed up, especially for gas that requires on-site treatment, such as wellhead gas, there being risk of fuel supply interruption. In order to address these problems, measures such as temporary storage of fuel needs to be considered at well site.

6. When the fracturing system is powered by the electricity grid, there is limitation to the fluctuation of electric power supplied by the electricity grid. Moreover, the stability of construction operation is directly affected by the stability of electricity grid, thus there is a relatively large risk of stability.
7. Some well sites are located in areas where there are usually no ready-made electricity supply facilities and need to be prepared in advance, resulting in higher costs and cycle costs.
8. In the case of offshore platform operations, there are problems of limited placement area and energy supply.
9. High-voltage generators are employed in conventional power supply schemes by generators, i.e., rectifier transformers need to be used to supply power to the rectifying units, while the rectifier transformers are too bulky, expensive, and involve complex wiring. The above features of the rectifier transformers themselves, to some extent, result in the power supply part in the electric drive equipment are bulky, i.e., occupy a large area, expensive, and involve complex wiring, thus greatly limiting the widely use of the electric drive equipment.

Therefore, there is a need for a fracturing system that is small in size, low in cost, and simple in wiring to address one or more of the foregoing problems.

SUMMARY

An objective of the present disclosure is to provide a fracturing system.

According to an aspect of the present disclosure, a fracturing system includes fracturing equipment. The fracturing equipment includes a power supply platform, a gas turbine engine, one or more rectifiers, and a power system including at least one of the following: a generator, an energy storage, and an electricity supplier. At least two of the gas turbine engine, the power system, and the one or more rectifiers are arranged on the power supply platform. A first end of the power system is connected to the gas turbine engine. A second end of the power system is connected to the one or more rectifiers. The power system is configured to output a voltage to the one or more rectifiers directly without passing through a rectifier transformer.

According to an aspect of the present disclosure, a fracturing system includes: a functional unit configured to perform procedures of fracturing operations; an electricity supply unit electrically connected to the functional unit, the electricity supply unit being configured to supply electrical energy to the functional unit; and an energy storage unit electrically connected respectively with the electricity supply unit and the functional unit, the energy storage unit being configured to store electrical energy from the electricity supply unit and supply electrical energy to the functional unit.

According to the present disclosure, the fracturing system includes an energy storage unit, which can store surplus electrical energy of the electricity supply unit and then supply electrical energy to the whole fracturing system when needed, thereby playing a role of energy storage and peak regulation, enabling the generator set and the like to maintain economic working condition for a long time, being safer and more stable, thus improving the efficiency and economy of the generator set. In addition, it is possible to generate electricity from non-carbon sources for fracturing operations. Moreover the fracturing system further minimizes the use of internal combustion engines, which is more environment-friendly. The present disclosure can also reduce the number of generator sets and the space occupied by the generator sets so as to reduce the construction cost of fracturing operations.

In one embodiment, the electricity supply unit includes a generator set, and the energy storage unit is configured to supply electrical energy to the generator set.

According to the present disclosure, the energy storage unit can provide necessary electrical energy for starting the generator set before the generator set starts.

In one embodiment, the fracturing system further includes a switch cabinet, a transformation unit, and a frequency conversion unit. The electricity supply unit is electrically connected with the functional unit via the switch cabinet, the transformation unit, and the frequency conversion unit. Wherein the energy storage unit is electrically connected with the functional unit through the switch cabinet, the transformation unit and the frequency conversion unit, or the energy storage unit is electrically connected with the functional unit via the transformation unit and the frequency conversion unit.

According to the present disclosure, the current supplied by the electricity supply unit to the functional unit can be controlled centrally, and the current can be transformed, rectified, and converted into the current that is suitable for the functional unit. In addition, the mode of electrical connection between the energy storage unit and the functional unit can be flexibly selected according to actual needs.

In one embodiment, the frequency conversion unit includes a rectifier module and an inverter module, wherein the transformation unit is integrated with the rectifier module, the inverter module is integrated with a power element of the functional unit, the rectifier module is electrically connected with the inverter module via a DC bus, and the energy storage unit is electrically connected with the DC bus or the inverter module.

According to the present disclosure, the rectifier module and the inverter module are arranged as two separate parts, and the output end of the energy storage unit can be selectively connected to the DC bus or the inverter module according to needs, thereby enhancing the flexibility of the arrangement.

In one embodiment, the charging interface of the energy storage unit is electrically connected with the rectifier module.

According to the present disclosure, the current input to the energy storage unit can be rectified with an appropriate frequency and voltage.

In one embodiment, the electricity supply unit, the energy storage unit, and the functional unit are electrically connected in series.

According to the present disclosure, the energy storage unit can form a part of the circuit through which electrical energy is supplied from the electricity supply unit to the functional unit, thus increasing the selectivity of the arrangement.

In one embodiment, the energy storage unit includes a battery module, a switch, a battery management module, a charging interface, and an electric supply interface.

According to the present disclosure, the energy storage unit can be conveniently controlled and managed through a battery management module as well as a switch.

In one embodiment, the energy storage unit further includes an additional rectifier module electrically connected between the charging interface and the battery module, or the energy storage unit further includes an additional inverter module, the electric supply interface includes an AC electric supply interface, wherein the additional inverter module is electrically connected between the battery module and the AC electric supply interface.

According to the present disclosure, the additional rectifier module can rectify the current input to the energy storage unit into direct current, or the energy storage unit can output alternating current, and the additional inverter module can convert the current output by the energy storage unit with appropriate frequency and voltage.

In one embodiment, the energy storage unit further includes a DC/DC converter electrically connected between the charging interface and the battery module and/or between the battery module and the electric supply interface.

According to the present disclosure, the effect of increasing or decreasing of DC voltage can be achieved inside the energy storage unit.

In one embodiment, the electric supply interface includes a DC electric supply interface which is electrically connected with the battery module directly.

According to the present disclosure, the energy storage unit can output direct current.

In one embodiment, the energy storage unit includes a bidirectional converter, and the charging interface and the electric supply interface are respectively electrically connected with the battery module via the bidirectional converter.

According to the present disclosure, the bidirectional converter has a function of rectification and inversion, thereby controlling the charging and discharging function of the energy storage unit.

In one embodiment, the fracturing system further includes a centralized control unit which is in communication connection with the functional unit and the energy storage unit in a wired and/or wireless manner, and the centralized control unit is used for monitoring and/or controlling working parameters of the functional unit and the energy storage unit.

According to the present disclosure, the working parameters of key equipment can be controlled, and the energy storage unit can be monitored and protected.

In one embodiment, the centralized control unit is configured to send out alarm information and/or reduce the power consumption of the functional unit when voltage, current and/or frequency of power supply to the functional unit deviate from a predetermined range.

According to the present disclosure, when the energy storage unit and/or the electricity supply unit fails, the electrical energy transmitted to the functional unit can be reduced to avoid safety accidents, at the same time, an alarm message can be sent for caution.

In one embodiment, the centralized control unit is configured to automatically control the energy storage unit to supply electrical energy to the electricity supply unit, the centralized control unit and/or the functional unit when power supply from the electricity supply unit is cut off.

According to the present disclosure, the switching between the power supply from the electricity supply unit and from the energy storage unit can be automatically realized.

In one embodiment, the centralized control unit is further configured to send out prompt information including working duration information prejudged according to remaining battery level of the energy storage unit and working power of the functional unit.

According to the present disclosure, it is possible to allow the operators to take necessary measures to continuously complete operations, or temporarily reduce power consumption, etc., so as to avoid operation accidents such as well blockage caused by sudden shutdowns.

In one embodiment, the centralized control unit controls the energy storage unit to operate in the following manner: all the battery modules are charged at the same time; or all the battery modules supply electrical energy at the same time; or some of the battery modules supply electrical energy and the others are charged.

According to the present disclosure, it is possible to select working mode of the energy storage unit flexibly according to needs.

In one embodiment, the centralized control system is configured to disconnect the electrical connection for charging the energy storage unit when voltage, current and/or frequency for charging the energy storage unit deviate from a predetermined range.

According to the present disclosure, the charging circuit can be cut off when there are errors during charging in order to protect the energy storage unit.

In one embodiment, the energy storage unit is arranged on a carrier.

According to the present disclosure, the energy storage unit can be transported easier. The carrier includes: auxiliary lifting appliance, semi-trailer, chassis vehicle, rail vehicle, base for lifting, skid, etc. which can transport the energy storage unit to a power station located off the well site for centralized charging.

In one embodiment, the electricity supply unit includes at least one of an electricity grid, a diesel generator set, a turbine generator set, a gas generator set, a nuclear reactor generator set, a photovoltaic electricity generating equipment, wind turbine electricity generating equipment and a fuel cell, wherein the fuel cell can be a natural gas fuel cell, a hydrogen fuel cell, and the like.

According to the present disclosure, it is possible to select the specific form of the appropriate power supply unit according to actual needs.

BRIEF DESCRIPTION OF THE DRAWINGS

For the sake of better understanding on the above and other objectives, features, advantages, and functions of the present disclosure, the preferred embodiments are provided with reference to the drawings. The same reference symbols refer to the same components throughout the drawings. It would be appreciated by those skilled in the art that the drawings are merely provided to illustrate preferred embodiments of the present disclosure, without suggesting any limitation to the protection scope of the present disclosure, and respective components therein are not necessarily drawn to scale.

FIG. 21 is a schematic diagram of a fracturing method according to some embodiments of the present disclosure.

LIST OF REFERENCE SYMBOLS 10 functional unit (or referred to as fracturing equipment)
20 electricity supply unit (or referred to as electricity supplier)
30 energy storage unit (or referred to as energy storage)
40 switch cabinet
50 transformation unit (or referred to as transformer)
60 frequency conversion unit (or referred to as frequency converter)
61 rectifier module (or referred to as rectifier)
62 inverter module (or referred to as inverter)
21 non-carbon energy electricity generating module (or referred to as non-carbon energy electricity generator)
22 carbon energy electricity generating module (or referred to as carbon energy electricity generator)
100/200/300/400/500/600/700 fracturing system

DETAILED DESCRIPTION OF EMBODIMENTS

Reference now will be made to the drawings to describe embodiments of the present disclosure. What will be described herein are only preferred embodiments according to the present disclosure. On the basis, those skilled in the art would envision other embodiments of the present disclosure which all fall into the scope of the present disclosure.

Figure 16:
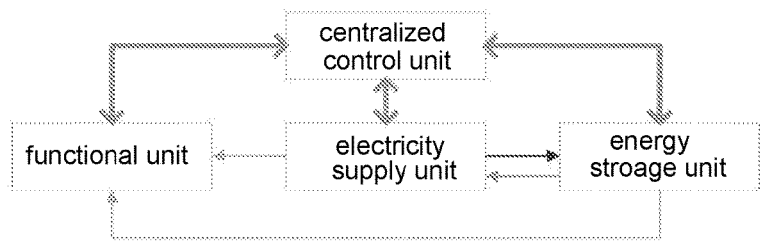
FIG. 16 is a system block diagram of the fracturing system according to the present invention.

The present disclosure provides a fracturing system for fracturing operation at oil and gas fields. As shown in FIG. 16, according to the present disclosure, the fracturing system mainly comprises a functional unit, an electricity supply unit, an energy storage unit, and a centralized control unit. Wherein the functional unit mainly includes functional equipment and/or components for performing each procedure of the whole fracturing operation, for example, the functional units may include mixing equipment, sand blender, sand conveyor, fracturing equipment, or cementing equipment and batch mixing equipment used in cementing operations, or electric drive equipment in drilling operation, etc. Wherein mixing equipment, sand blender, sand conveyor, fracturing equipment and the like may include power elements to provide driving force, all or most of which are electric motors. In other words, according to the present disclosure, all or most of the fracturing system is electrically driven.

The electricity supply unit is electrically connected with each electrically driven power element of the functional unit and provides electrical energy so that each part of the functional unit can realize its function. Specifically, the electricity supply unit may include one of an electricity grid, a diesel generator set, a turbine generator set, a gas generator set, a nuclear reactor generator set, photovoltaic generation equipment, a wind power plant and a fuel cell or a combination of one or more of the above-mentioned. Those skilled in the art can flexibly select the specific form of the electricity supply unit according to actual situation of the well site. In addition, the electricity supply unit can also be electrically connected with the centralized control unit to supply electrical energy to the centralized control unit.

The centralized control unit is usually located in a fracturing instrument vehicle or a remote command center, and can be in communication connection with the functional unit in a wired or wireless manner. The centralized control unit can be respectively in communication connection with the functional unit, the electricity supply unit, and the energy storage unit. Therefore, the centralized control unit can be used for monitoring or controlling pressure of fracturing equipment, temperature, and rotational speed parameters of key devices at the well site, as well as running parameters, such as rotational speed of electric motor of fracturing pump vehicle, rotational speed of electric motor for heat dissipation of fracturing equipment, rotational speed of electric motor of sand blender and mixing equipment. The centralized control unit may have a local control mode or a remote control mode.

The energy storage unit is electrically connected with the electricity supply unit, the functional unit, and the centralized control unit respectively. On the one hand, the energy storage unit can store electrical energy from the electricity supply unit; on the other hand, the energy storage unit can also be used as a backup of the electricity supply unit or as a supplement to supply electrical energy to the functional unit.

A specific charging process can be as follows:

For example, in an embodiment that the electricity supply unit includes a generator set, the fracturing equipment of the functional unit is configured to stop working during clearance of fracturing operation, while the generator set still keeps a working condition of high generating efficiency to charge the energy storage unit, so as to avoid frequent start and stop of the generator set or idling running of the generator set which will lead to a waste of fuel and energy.

Alternatively, during the fracturing operation process, surplus electrical energy can be stored in the energy storage unit when generating capacity of the generator set is higher than electric power needed in actual working condition of the functional unit, thereby enabling the generator set to keep a steady and efficient running condition.

A specific electrical energy supply process can be as follows:

For example, the need for electric power is low in the clearance of the fracturing operation or in a preparation stage of pre-fracturing operation when most of the fracturing equipment stop working. Hence the fracturing operation can be power supplied by the energy storage unit directly with the generator set being shut down and the electricity grid disconnected.

Alternatively, when the generator set or the electricity grid fails to provide electrical energy for the electrical equipment, the energy storage unit can be used to provide electrical energy so as to ensure the normal operation of the electrical equipment, thereby avoiding interruption of fracturing operation due to power supply problem, and further avoiding safety problems such as well plugging caused by interruption of fracturing operation.

Alternatively, the energy storage unit can also supply electrical energy to other important communication, monitoring and control equipment such as centralized control unit, control module of generator set, control module of other equipment, and monitoring system of well site, etc., so as to ensure the reliability of key systems such as communication and control system when the power equipment or the electricity grid fail.

Alternatively, under the condition that the electric capacity of the energy storage unit is large enough to meet the power demand during fracturing operation, the energy storage unit or the electricity supply unit can be selectively used to alternately provide electrical energy for fracturing operation. For example, when the air temperature is appropriate or under other conditions that are suitable for internal combustion engine power generation, the generator set can be used to supply electrical energy, while during low power consumption periods, the electricity grid, photovoltaic and wind turbine can be used to supply electrical energy, with the energy storage unit being charged at chosen time meanwhile. Under some other conditions such as the air temperature is too high to use the above-mentioned power generation methods to supply electrical energy, or during the period of peak electricity consumption, the energy storage unit can be used for electric energy supply so as to enhance economic efficiency. At this time, a part of the energy storage unit can be used as a backup power supply to ensure the safety and stability of power supply at the well site.

FIGS. 1 to 6 respectively show various configurations of an energy storage unit for a fracturing system according to the present disclosure.

Figure 1:
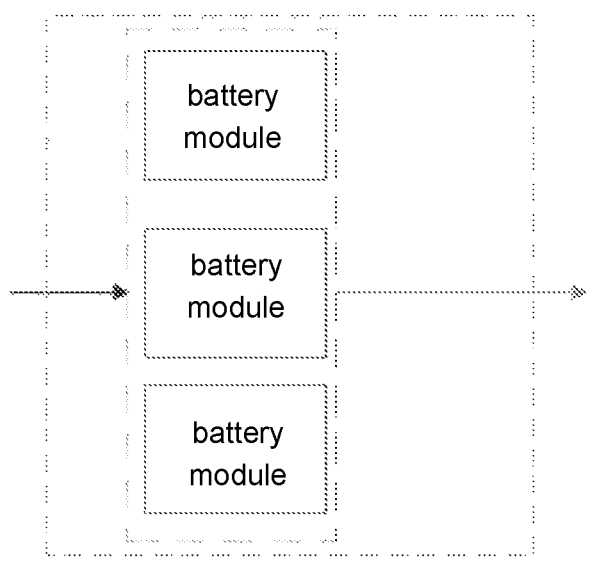
FIG. 1 is a schematic diagram of a first configuration of an energy storage unit used in a fracturing system according to the present disclosure.

As shown in FIG. 1, the energy storage unit includes a battery module for storing electrical energy. The battery module may specifically be chemical batteries and/or super capacitors or a combination of one or more of the above, etc. Wherein the chemical battery may be, for example, a lithium ion battery, a sodium ion battery, or a lithium iron phosphate battery, etc.

In addition, although not shown in the drawings, it can be understood that in order to realize the functions of storing and supplying electrical energy by the battery module, the energy storage unit also includes a battery management module, a charging interface, an electric supply interface, a switch, and the like. The battery module can be electrically connected with the electricity supply unit via the charging interface and can be electrically connected with components needing power supply via the electric supply interface. The switch is used to control the on-off state of the electrical connection between the energy storage unit and other units. The battery management module can detect the key parameters of the battery module so as to protect the energy storage unit, such as under-voltage protection, overload protection, overcurrent protection, short circuit protection and over-temperature protection, etc. The battery management module may also have a minimum protected battery level. For example, the battery management module may be set a minimum protected battery level to ensure that the battery module stores sufficient backup battery level or achieve the purpose of protecting the battery. When approaching, reaching, or falling below the set minimum protected battery level, the battery management module generates a corresponding instruction or cuts off the output power supply, such as sending out a prompt message.

In addition, the battery management module can be in communication connection with the centralized control unit of the fracturing system through wired, wireless, Ethernet and other communication methods. The centralized control unit can control the charging and power supply operation of the energy storage unit in a local control mode or a remote control mode. For example, the centralized control unit can control part of the battery modules of the energy storage unit to be charged while the other part of the battery modules to supply electrical energy; or the centralized control unit can control all battery modules to be charged at the same time; or the centralized control unit can control all battery modules to supply electrical energy at the same time. A charging protection program can also be set. When the frequency, current, voltage and temperature of charging are abnormal, the charging protection program can cut off the charging power supply to avoid safety accidents.

In addition, the centralized control unit can monitor the parameters of the energy storage unit such as battery level, temperature, current, voltage, etc. and can display these parameters to the operator. When the electricity supply unit or the energy storage unit is abnormal, the centralized control unit can judge the abnormal situation according to collected signals, and then display alarm information, or prompt operation precautions, or automatically control the functional unit, such as reducing power consumption, specifically, reducing VFD output current or closing part or all of VFD output, or reducing flushing times of some fracturing pumps, etc. When an emergency occurs at the well site, the centralized control unit can be used for emergency shutdown. The centralized control unit can also turn off an output switch of the electricity supply unit or the electricity supply unit itself through a remote stop button or a remote stop command on the touch screen, specifically, for example, stopping running of turbine generator, or turning off an output switch of the energy storage unit or the energy storage unit itself, or stopping output current of VFD.

When the electricity supply unit stops supplying power due to emergency shutdown, the centralized control unit can automatically adjust power supply function of the energy storage unit according to preset conditions. For example, when turbine generator stops running, the centralized control unit can control the energy storage unit to supply power to the turbine engine, the centralized control unit, and the like in an automatic or manual manner through a remote control mode or a local control mode so as to ensure engine lubrication, heat dissipation and stability of the centralized control unit.

When the electricity supply unit stops supplying electrical energy due to an emergency, the centralized control unit can adjust the power supply function of the energy storage unit according to a preset program in order to continue supplying power for the functional units necessary for operation at the well site, at the same time, the centralized control unit sends out prompt information to operator. The prompt information can include a prejudged operation duration information according to operation situation (inferring electrical energy consumption based on current power consumption or preset operating parameters of different stages of functional units), so that the operators can take necessary measures to continuously complete the operation, or temporarily reduce power consumption, etc., to avoid operation accidents such as well blockage caused by sudden shutdown.

Figure 2:
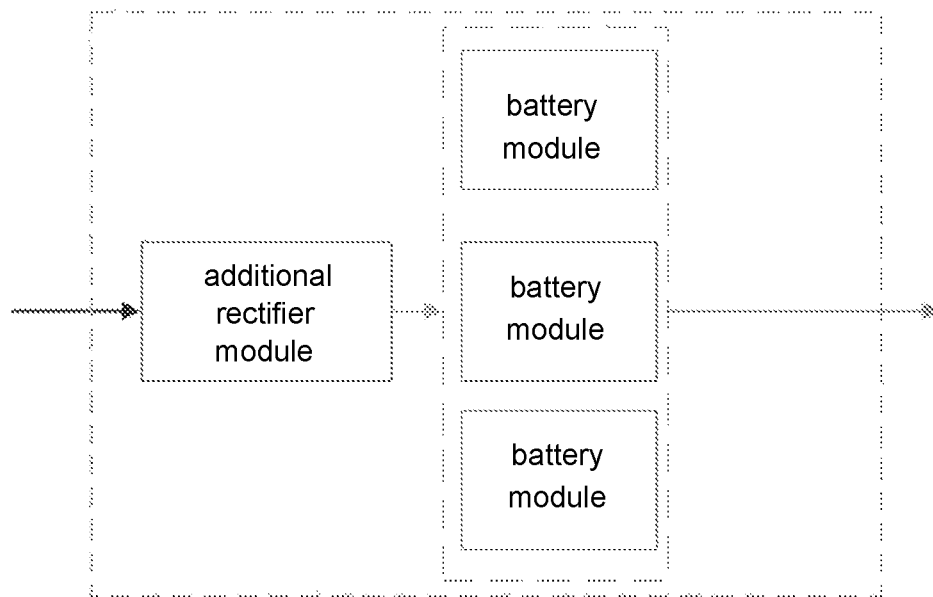
FIG. 2 is a schematic diagram of a second configuration of an energy storage unit used in a fracturing system according to the present disclosure.

FIG. 2 shows a second configuration of energy storage unit. Compared with the energy storage unit shown in FIG. 1, the energy storage unit shown in FIG. 2 further includes an additional rectifier module electrically connected between the charging interface and the battery module. The additional rectifying module can rectify charging current input to the energy storage unit, changing it from alternating current into direct current and providing sufficient charging voltage to the battery module. That is, the additional rectifying module can play a role of charging.

Figure 3:
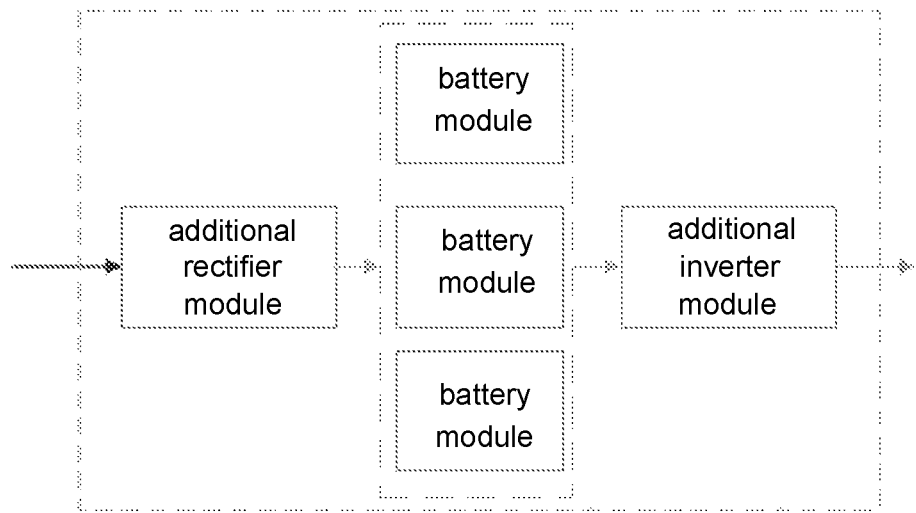
FIG. 3 is a schematic diagram of a third configuration of an energy storage unit used in a fracturing system according to the present disclosure.

FIG. 3 shows a third configuration of energy storage unit. Compared with the energy storage unit shown in FIG. 2, the energy storage unit shown in FIG. 3 further includes an additional inverter module electrically connected between the battery module and the electric supply interface. The additional inverter module can convert direct current output by the battery module into alternating current with constant frequency and voltage or frequency modulation and voltage regulation. Therefore, the energy storage unit according to the third configuration can output alternating current. Correspondingly, the electric supply interface electrically connected with the additional inverter module is an AC electric supply interface.

Figure 4:
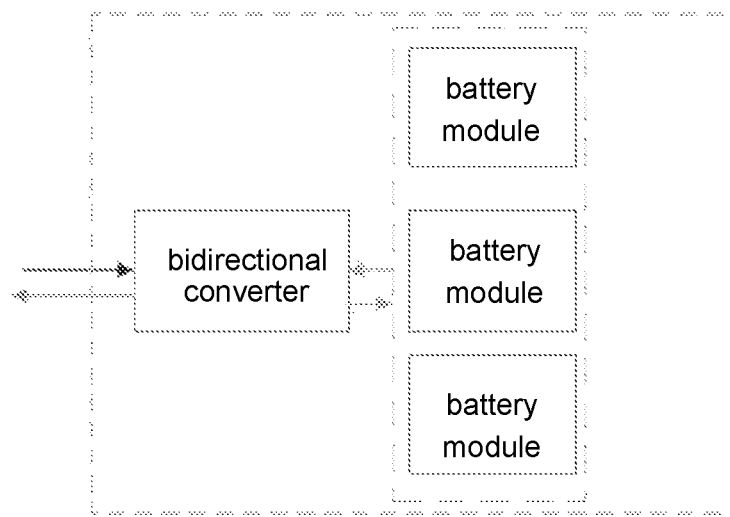
FIG. 4 is a schematic diagram of a fourth configuration of an energy storage unit used in a fracturing system according to the present disclosure.

FIG. 4 shows a fourth configuration of energy storage unit. Compared with the energy storage unit shown in FIG. 1, the energy storage unit shown in FIG. 4 further comprises a bidirectional converter. The charging interface and the electric supply interface of the energy storage unit are respectively electrically connected with the battery module through the bidirectional converter. The bi-directional converter can achieve conversion between DC and AC, control the charging and discharging process of the battery module, realize regulation of active power and reactive power of the electricity grid, and can also directly supply electrical energy to AC load without the electricity grid.

Figure 5:
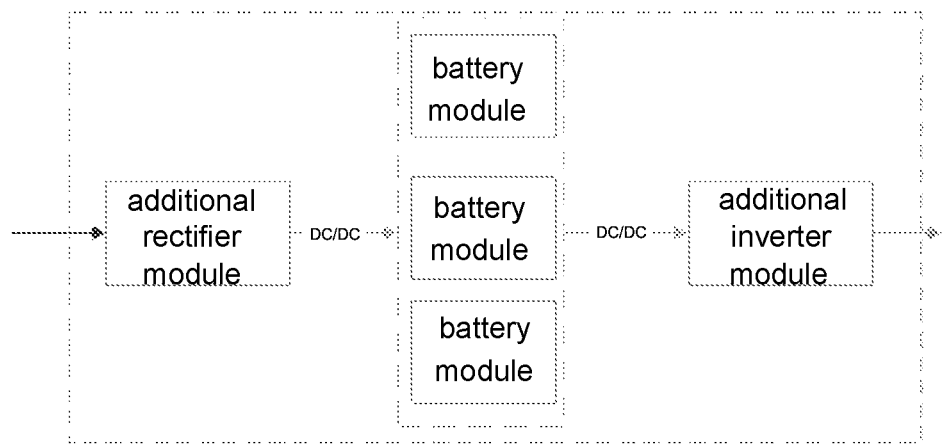
FIG. 5 is a schematic diagram of a fifth configuration of an energy storage unit used in a fracturing system according to the present disclosure.

FIG. 5 shows a fifth configuration of energy storage unit. Compared with the energy storage unit shown in FIG. 3 or FIG. 4, the energy storage unit shown in FIG. 5 further includes a DC/DC converter. The DC/DC converter is arranged in series between the additional rectification module and the battery module as well as the battery module and the additional inverter module. The DC/DC converter can transform and adjust DC voltage input to the battery module as well as DC voltage output from the battery module. Of course, as an alternative embodiment, a DC/DC converter may be provided only between the additional rectification module and the battery module, or only between the battery module and the additional inverter module. In addition, the additional rectifier module and the additional inverter module can be replaced with a bidirectional converter to adjust current characteristics. In addition, it is also possible to omit the additional rectifier module and the additional inverter module with only the DC/DC converter being provided.

Figure 6:
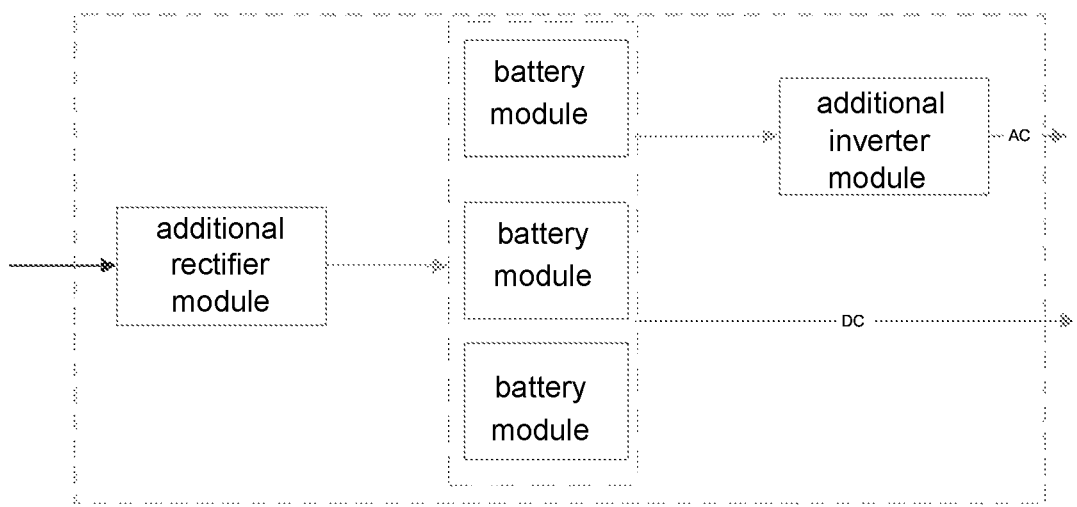
FIG. 6 is a schematic diagram of a sixth configuration of an energy storage unit used in a fracturing system according to the present disclosure.

FIG. 6 shows a sixth configuration of energy storage unit. Compared with the energy storage unit shown in FIG. 3, the energy storage unit shown in FIG. 6 further comprises a DC electric supply interface. The DC electric supply interface is directly electrically connected with the battery module in parallel with the additional inverter module and the AC electric supply interface. Therefore, according to the sixth configuration, the energy storage unit can simultaneously output alternating current and direct current.

FIGS. 7 to 12 respectively show fracturing systems of different embodiments according to the present disclosure. The following is a detailed description with reference to the accompanying drawings.

Figure 7:
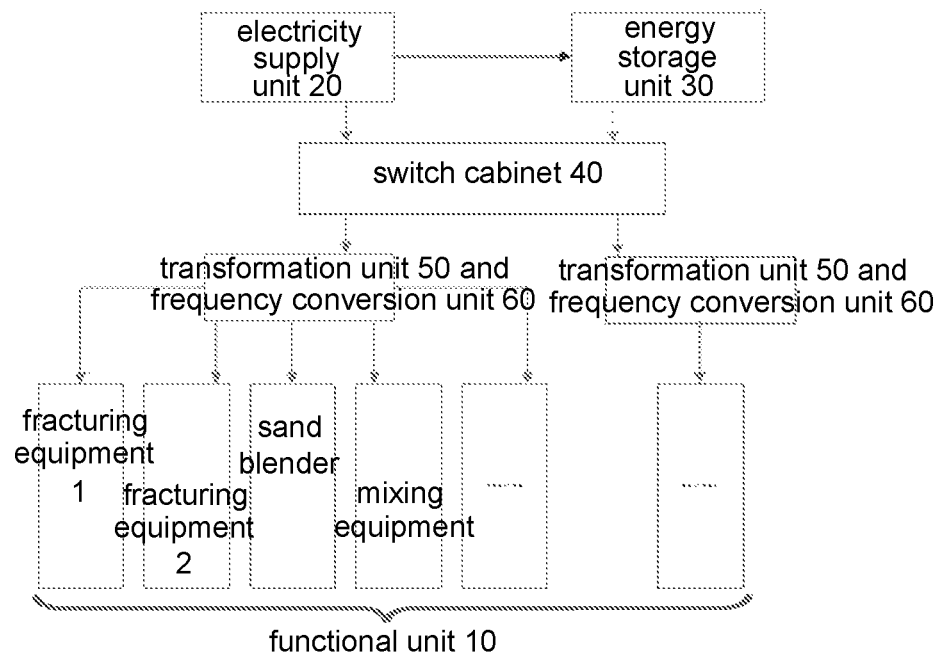
FIG. 7 is a schematic diagram of a fracturing system according to a first embodiment of the present disclosure.

As shown in FIG. 7, in a first embodiment, in addition to a functional unit 10, an electricity supply unit 20, and an energy storage unit 30 described above, fracturing system 100 preferably further comprises a switch cabinet 40, a transformation unit 50 and a frequency conversion unit 60. The switch cabinet 40 is used to centrally control branching, merging, on-off state and the like of electrical connections between various functional devices and/or components from the electricity supply unit 20 to the functional unit 10. It can be understood that when the electricity supply unit 20 and the energy storage unit 30 are connected to the switch cabinet 40 at the same time, the switch cabinet 40 can be interconnected or connected separately. The transformation unit 50 and the frequency conversion unit 60 are located between the switch cabinet 40 and the functional unit 10 which are used for transforming, rectifying and frequency converting current input to the functional unit 10. Wherein, the transformation unit 50 may include a transformer. The frequency conversion unit 60 may include a frequency converter (Variable-frequency Drive, VFD). Wherein, there are respectively at least one transformation unit and one variable frequency unit, preferably two or more groups, so that AC variable-frequency currents with different voltages can be output.

The charging interface of the energy storage unit 30 is electrically connected to a power generation port of the electricity supply unit 20. And the electric supply interface of the energy storage unit 30 is connected with an input end of the switch cabinet to supply electrical energy to the functional unit 10.

Figure 8:
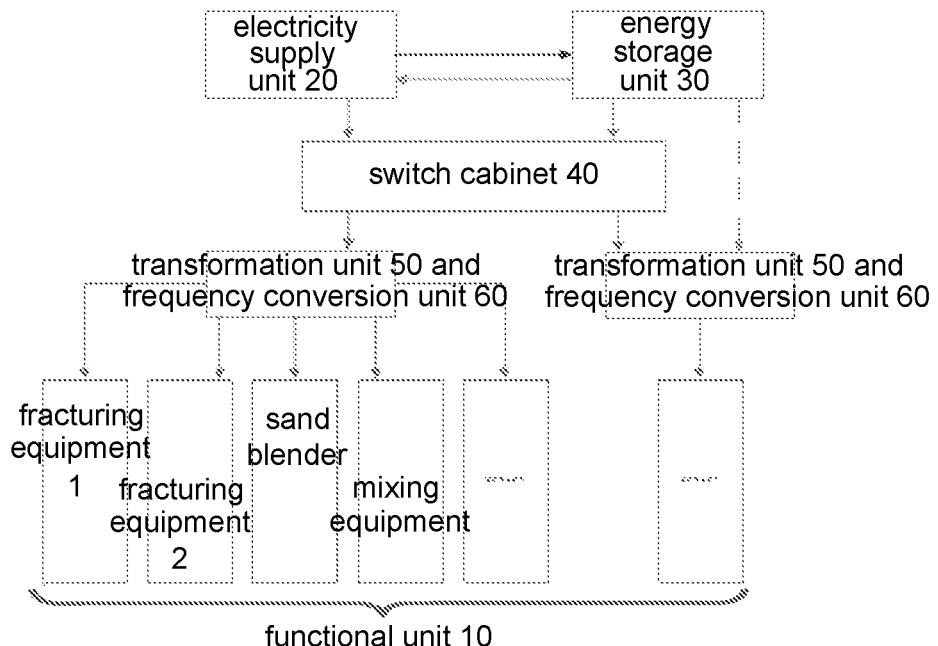
FIG. 8 is a schematic diagram of a fracturing system according to a second embodiment of the present disclosure.

FIG. 8 shows a fracturing system 200 according to a second embodiment of the present disclosure, which is substantially the same as the fracturing system 100 of the first embodiment shown in FIG. 7. The difference is that, in the fracturing system 200, the electricity supply unit 20 includes a generator set, such as a turbine generator set or the like. The electric supply interface of the energy storage unit 30 may be electrically connected to a power consumption port of the electricity supply unit 20. Thus, the energy storage unit 30 can not only supply electrical energy to the functional unit 10 but also to the electricity supply unit 20. For example, before the generator set is started, the energy storage unit 30 can provide the electricity supply unit 20 with the electrical energy required to start; or when the generator set is shut down, the energy storage unit 30 can provide the necessary electrical energy to the generator set to ensure normal running of heat dissipation system or lubrication system of the generator set.

In addition, in the fracturing system 200, the energy storage unit 30 may also be directly electrically connected to the functional unit 10 through the transformation unit 50 and the frequency conversion unit 60 without passing through the switch cabinet 40. In this case, the on-off state of the electrical connection between the energy storage unit 30 and the functional unit 10 can be controlled by the switch of the energy storage unit 30 itself.

Figure 9:
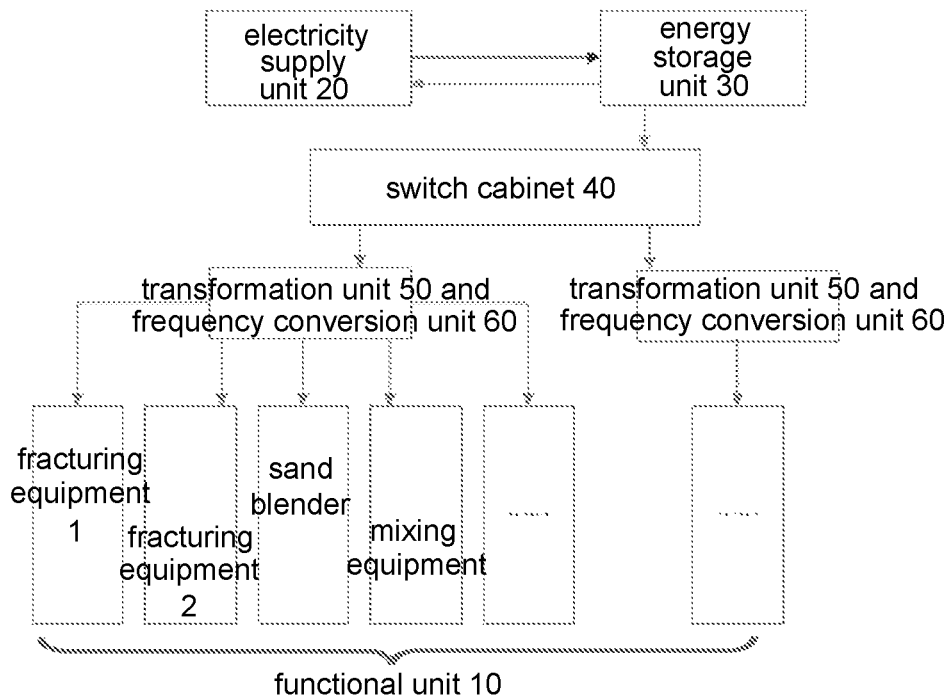
FIG. 9 is a schematic diagram of a fracturing system according to a third embodiment of the present disclosure.

FIG. 9 shows a fracturing system 300 according to a third embodiment of the present disclosure, which is substantially the same as the fracturing system 200 of the second embodiment shown in FIG. 8. The difference is that, in the fracturing system 300, the energy storage unit 30 is directly electrically connected with the switch cabinet 40, while the electricity supply unit 20 is electrically connected with the switch cabinet 40 via the energy storage unit 30. Therefore, the energy storage unit 30 is used to provide electrical connection from the electricity supply unit 20 to the functional unit 10 in addition to the function of storing electrical energy. In other words, in the fracturing system 300, the electricity supply unit 20, the energy storage unit 30 and the functional unit 10 are connected in series.

Figure 10:
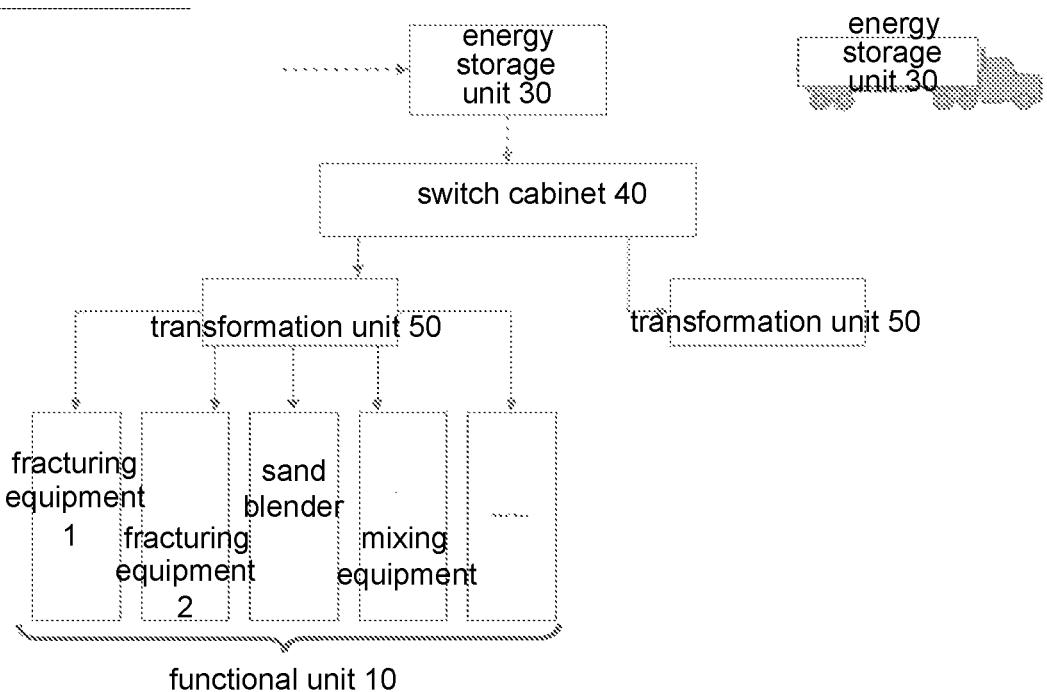
FIG. 10 is a schematic diagram of a fracturing system according to a fourth embodiment of the present disclosure.

FIG. 10 shows a fracturing system 400 according to a fourth embodiment of the present disclosure, wherein the electricity supply unit is omitted. In the fracturing system 400, the energy storage unit 30 may be moved by a carrier such as a truck or trailer. Such an arrangement may allow a power station to be arranged outside the well site, and the energy storage unit 30 may be transported outside the well site for centralized charging by means of a carrier.

Figure 11:
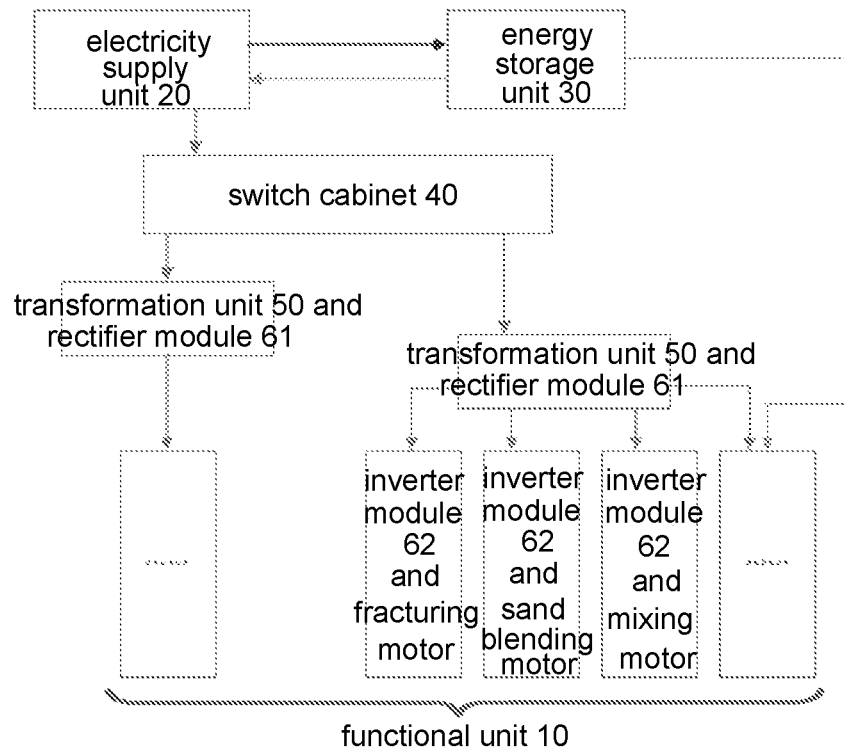
FIG. 11 is a schematic diagram of a fracturing system according to a fifth embodiment of the present disclosure.

FIG. 11 shows a fracturing system 500 according to a fifth embodiment of the present disclosure, which is substantially the same as the fracturing system 200 of the second embodiment shown in FIG. 8. The difference is that, in fracturing system 500, the frequency conversion unit is divided into a rectifier module 61 and an inversion module 62. Wherein the rectifier module 61 and the transformation unit 50 are integrated as a single device, and can supply rectified current to sand blender, mixing equipment, fracturing equipment, and other devices of the functional unit 10. In addition, sand blender, mixing equipment, fracturing equipment and other devices all include inverters and electric motors. The inverter of each device constitutes the inverter module 62. The rectifier module 61 may be electrically connected to the inverter module 62 through a DC bus. This arrangement can improve the flexibility of the arrangement of each unit in the fracturing system 500.

The energy storage unit 30 outputs direct current, and its electric supply interface bypasses the switch cabinet 40, the transformation unit 50 and the rectifier module 61, and is directly electrically connected to inverters of various devices of the functional unit 10 or directly connected to DC buses.

Figure 12:
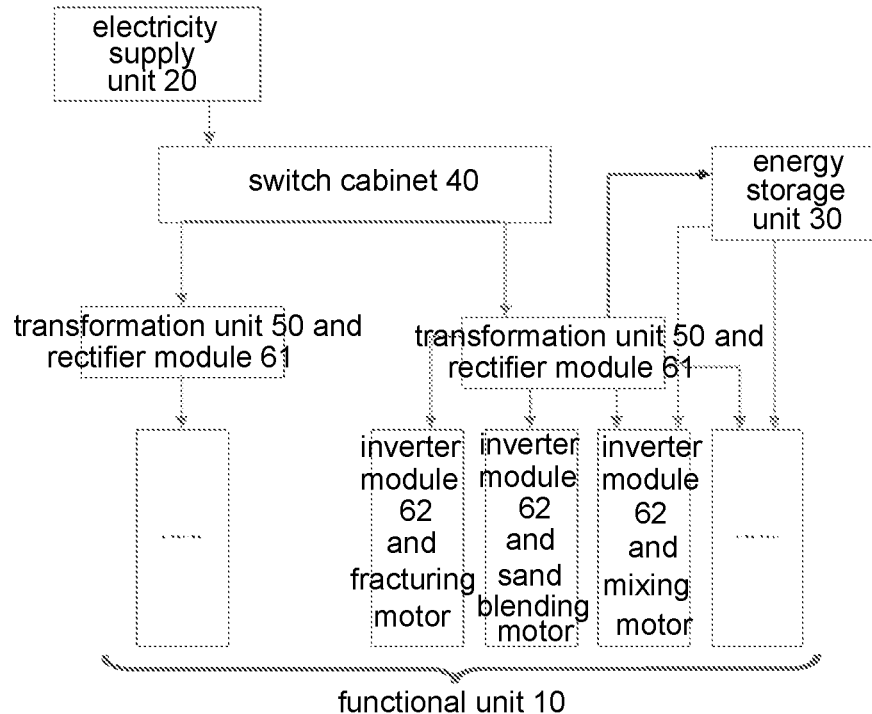
FIG. 12 is a schematic diagram of a fracturing system according to a sixth embodiment of the present disclosure.
Figure 13:
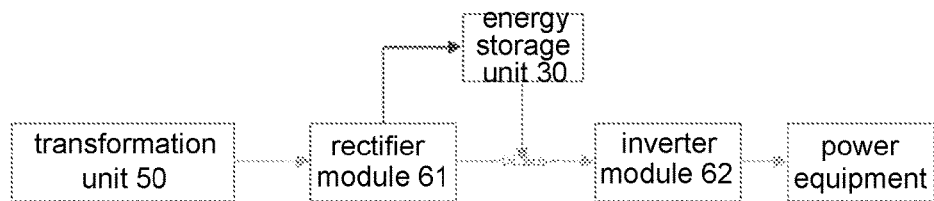
FIG. 13 is a schematic diagram of another connection configuration of the energy storage unit of the fracturing system shown in FIG. 12.

FIG. 12 shows a fracturing system 600 according to a sixth embodiment of the present disclosure, which is substantially the same as the fracturing system 500 of the fifth embodiment shown in FIG. 11. The difference is that, in fracturing system 600, the charging interface of the energy storage unit 30 is electrically connected to a rectifier module 61 rather than directly connected with the electricity supply unit 20. In this way, current input to the energy storage unit 30 is rectified DC current, so that the additional rectifier module can be omitted from the energy storage unit 30. Similar to the fracturing system 500 according to the fifth embodiment, the electric supply interface of the energy storage unit 30 is directly electrically connected to inverters of various devices of the functional unit 10, or as shown in FIG. 13, is directly electrically connected to a DC bus between the rectifier module 61 and the inverter module 62.

Figure 14:
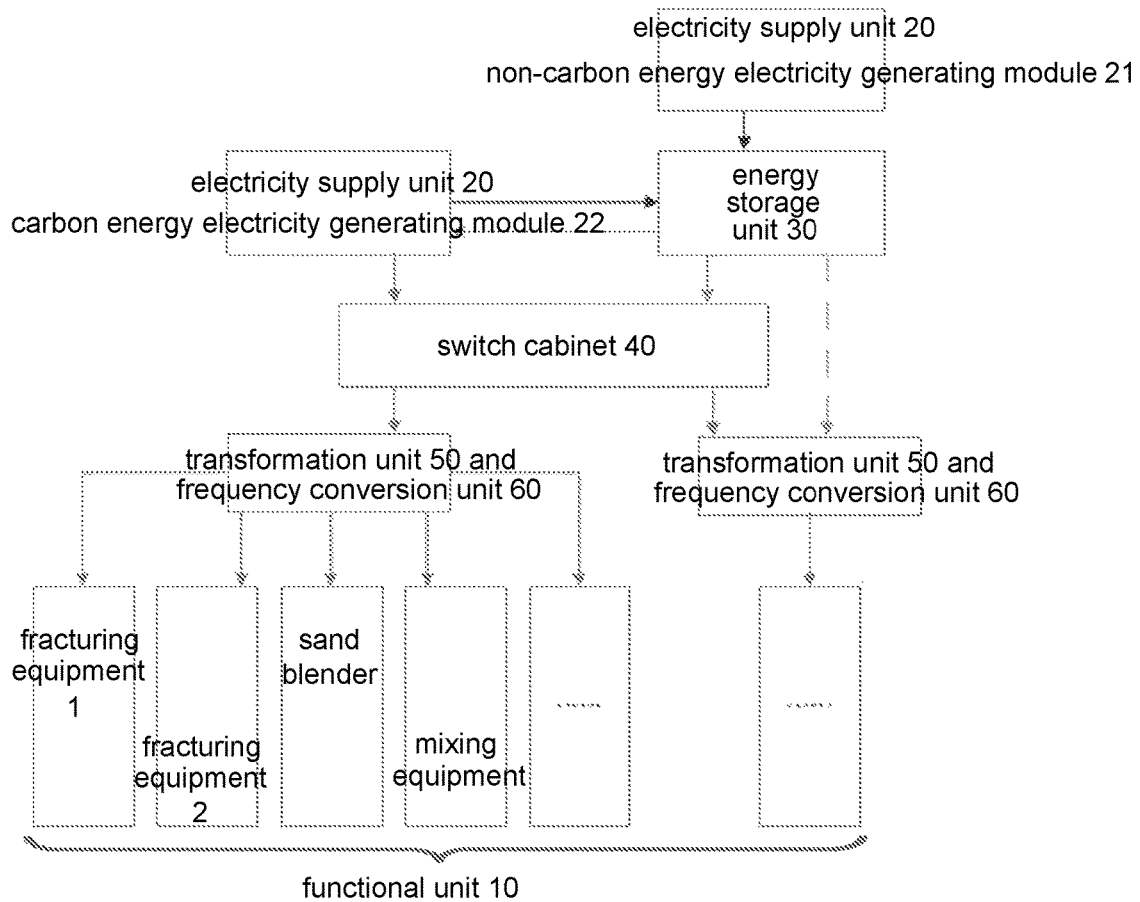
FIG. 14 is a schematic diagram of a fracturing system according to a seventh embodiment of the present disclosure.

FIG. 14 shows a fracturing system 700 according to a seventh embodiment of the present disclosure. In the seventh embodiment, the electricity supply unit 20 may only comprises a non-carbon energy electricity generating module 21, such as solar energy electricity generating equipment, wind turbine electricity generating equipment, hydrogen fuel cell, etc., so that the fracturing system 700 is completely powered by the non-carbon energy. This can reduce the use of carbon energy electricity generating equipment, thus reducing carbon emissions and achieving the effects of energy conservation and environmental protection.

More specifically, on the basis of comprising the non-carbon energy electricity generating module 21, the electricity supply unit 20 may also comprise a carbon energy electricity generating module 22, such as a natural gas fuel cell, an internal combustion engine electricity generating device, etc. When the energy storage unit 30 needs to be charged, it can be selectively charged by the non-carbon energy electricity generating module 21 or the carbon energy electricity generating module 22. Such an arrangement, on the one hand, can maximize the use of non-carbon energy electricity generating equipment for electricity generation, thereby reducing carbon emissions; On the other hand, it can address the problem of insufficient continuity of power supplied from non-carbon energy sources. When non-carbon energy sources cannot provide electrical energy (for example, when solar energy electricity generating equipment cannot be used for night charging), the carbon energy electricity generating module 22 can be flexibly selected to supply electrical energy or charge the energy storage unit 30.

Specifically, as shown in FIG. 14, the non-carbon energy electricity generating module 21 and the carbon energy electricity generating module 22 are respectively electrically connected with the energy storage unit 30 to charge it. The non-carbon energy electricity generating module 21 is electrically connected to the switch cabinet 40 via the energy storage unit 30, and the carbon energy electricity generating module 22 is directly electrically connected to the switch cabinet 40 to respectively supply power to the functional units 10. In addition, the electric supply interface of the energy storage unit 30 is also electrically connected with a power consumption port of the carbon energy electricity generating module 22 to supply electricity generating to the carbon energy electricity generating module 22.

Figure 15:
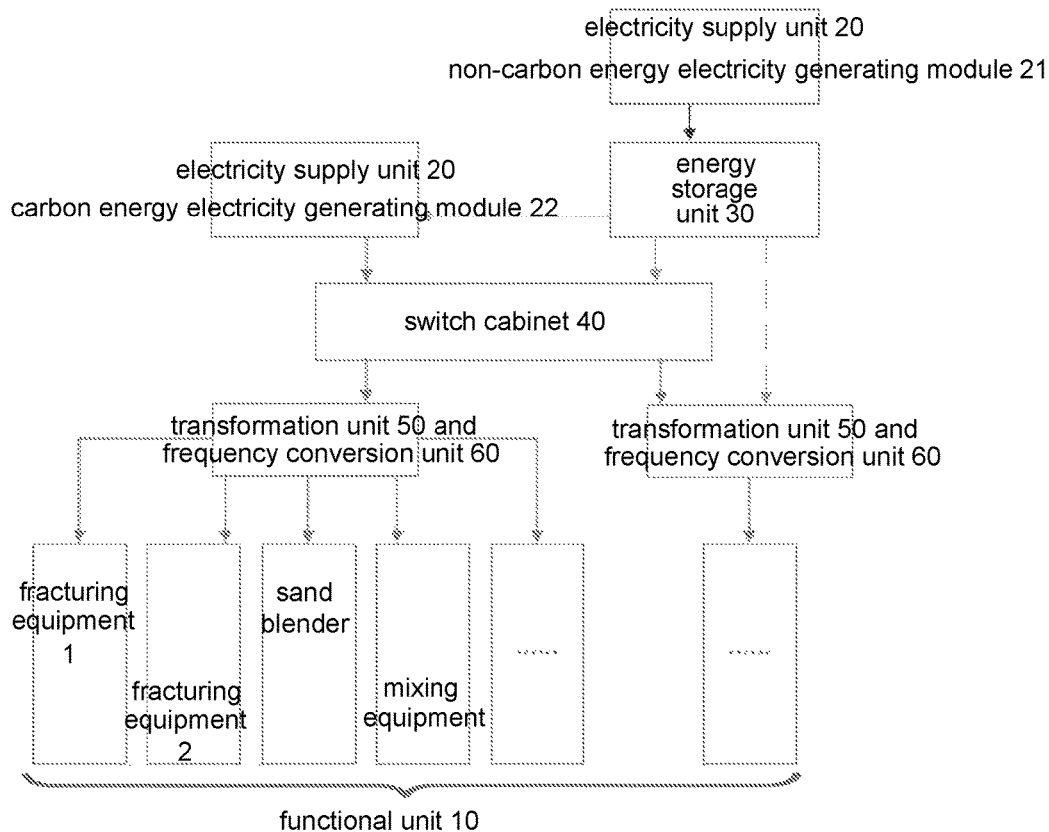
FIG. 15 is a schematic diagram of a modification of the fracturing system according to the seventh embodiment of the present disclosure.

FIG. 15 shows a modification of the fracturing system 700 of the seventh embodiment. In this modification, the charging interface of the energy storage unit 30 can only be electrically connected to the non-carbon energy electricity generating module 21. That is, the energy storage unit 30 is only charged by the non-carbon energy electricity generating module 21. However, an electricity generating port of the carbon energy electricity generating module 22 is only electrically connected to the switch cabinet 41, and a power consumption port of the carbon energy electricity generating module 22 is electrically connected to the electric supply interface of the energy storage unit 30. As a result, the carbon energy electricity generating module 22 supplies electrical energy only to the functional unit 10, and the energy storage unit 30 can supply electrical energy to the carbon energy electricity generating module 22 when necessary. It can be understood that there is no correspondence between the different configuration of energy storage units in the foregoing description and various embodiments of fracturing systems. Under the premise of adaptation, one configuration of energy storage unit can be applied to fracturing systems of different embodiments, for example, the energy storage unit shown in FIG. 3 can be applied to fracturing system 100 according to the first embodiment, fracturing system 200 according to the second embodiment, and fracturing system 300 according to the third embodiment, etc. In addition, a fracturing system may use different configurations of energy storage units, for example, the fracturing system 100 according to the first embodiment may use the energy storage units shown in FIGS. 2, 3 and 4.

The fracturing system provided by the present disclosure comprises an energy storage unit, the energy storage unit of the fracturing system can store redundant electrical energy of the electricity supply unit and supply electrical energy to the whole fracturing system when needed, playing the role of energy storage as well as peak shaving so that the generator set and the like can keep economic working condition for a long time, thus the system can be safe, stable, and achieve improved efficiency and economy. In addition, the present disclosure makes it possible to generate electricity from non-carbon sources for fracturing operations. It minimizes the use of internal combustion engines thus is more environment-friendly. The present disclosure can also reduce the number of generator sets and the space occupied by which so as to reduce the operation cost of fracturing operations.

In some embodiments, an objective of the present invention is to provide a power supply semi-trailer for electric drive fracturing equipment, including a combination of a gas turbine engine, a generator and a rectifying unit, the generator is connected to the rectifying units directly to obviate conventional rectifier transformer equipment. The rectifying unit is connected to the inversion unit through a common DC bus, so that the common DC bus can separately drive multiple inversion units, thus decreasing the wirings of power supply lines. A high voltage inversion unit is disposed on a gooseneck of the electric drive semi-trailer to optimize the spatial arrangement of equipment. The entire power supply equipment has a compact structure and low coast, occupies a small area, and is simple in wiring.

The objective may be achieved by the following technical measures: a power supply semi-trailer for electric drive fracturing equipment, including a power supply platform, one gas turbine engine, one generator, multiple sets of rectifying units and multiple sets of inversion units, wherein the gas turbine engine, the generator and the rectifying units are integrated on the power supply platform; one end of the generator is connected to the gas turbine engine, the other end of the generator is connected to the rectifying units, the multiple sets of rectifying units are arranged side by side; the inversion units are disposed on a gooseneck of the electric drive power supply platform, and the rectifying units are connected to the inversion units through a common DC bus.

In some embodiments, the generator is a double-winding generator. In one embodiment, the generator is connected to the rectifying units directly. In one embodiment, a phase difference of double winding of the generator is 30°, and the winding configuration is type Y-Y or type D-D. In one embodiment, the power of the generator is at least 10 MVA, and the frequency is 50-60 Hz or 100-120 Hz. In one embodiment, the voltages of the rectifying units range from 4000 VDC to 6500 VDC. In one embodiment, each of the inversion units includes two three-level inverters. In one embodiment, the inversion units disposed on another gooseneck of the semi-trailer are high voltage inversion units.

In some embodiments, the present application has the following technical improvements: 1. employing a combination of a gas turbine engine, a generator and rectifying units, the generator is connected to the rectifying units directly to obviate conventional rectifier transformer equipment; 2. the rectifying units are connected to the inversion units through a common DC bus, so that the common DC bus can separately drive multiple inversion units, thus decreasing the wirings of power supply lines; 3. a high voltage inversion unit is disposed on a gooseneck of the electric drive semi-trailer to optimize the spatial arrangement of equipment; 4. the entire power supply equipment has a compact structure, occupies a small area, and is simple in wiring; 5. the output power of the entire power supply equipment is high, providing a forceful guarantee for the high-power electric drive fracturing equipment.

Referring to FIGS. 17-20, references in the figures may include: 901. power supply platform, 902. gas turbine engine, 903. power system, 904. rectifying unit (or referred to as rectifier), 905. high voltage inversion unit (or referred to as high voltage inverter), 906. electric drive fracturing equipment, 907. gooseneck, 908. electric drive power supply platform, 909. double-winding generator, 910. three-level inverter, 911. common DC bus, and 912. plunger pump.

Figure 17:
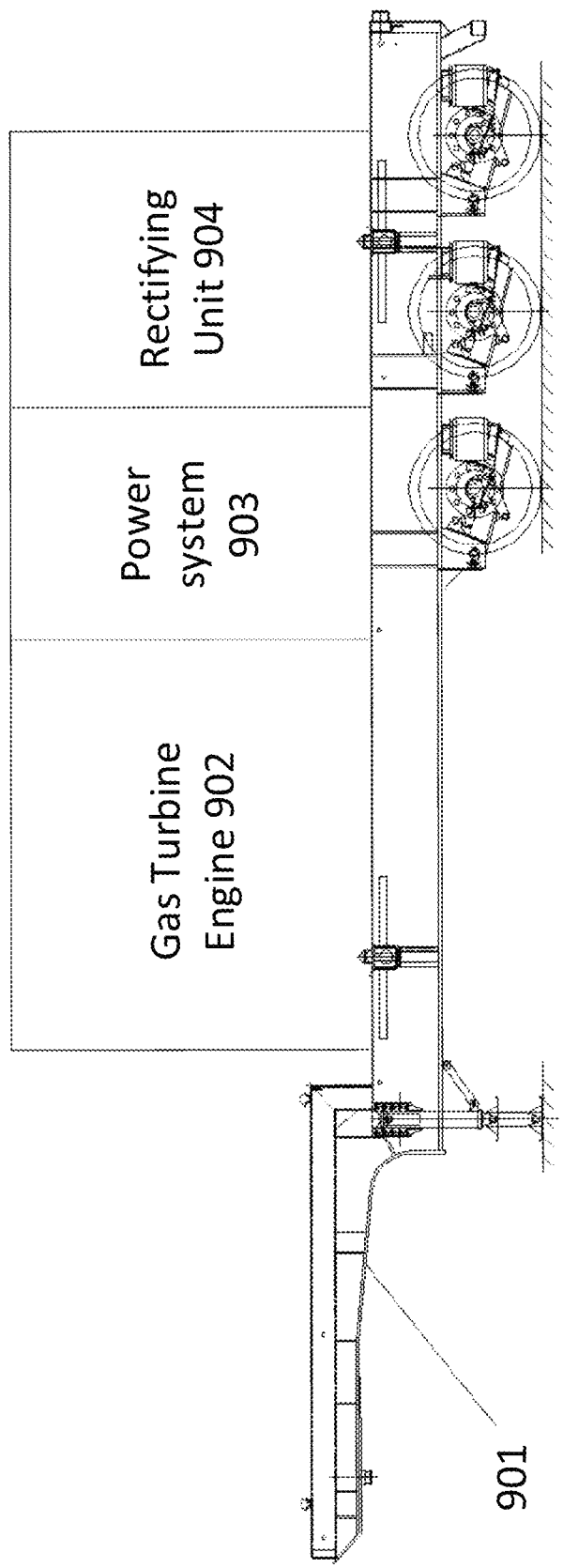
FIG. 17 is a schematic structural diagram of a power supply semi-trailer according to some embodiments of the present disclosure.
Figure 18:
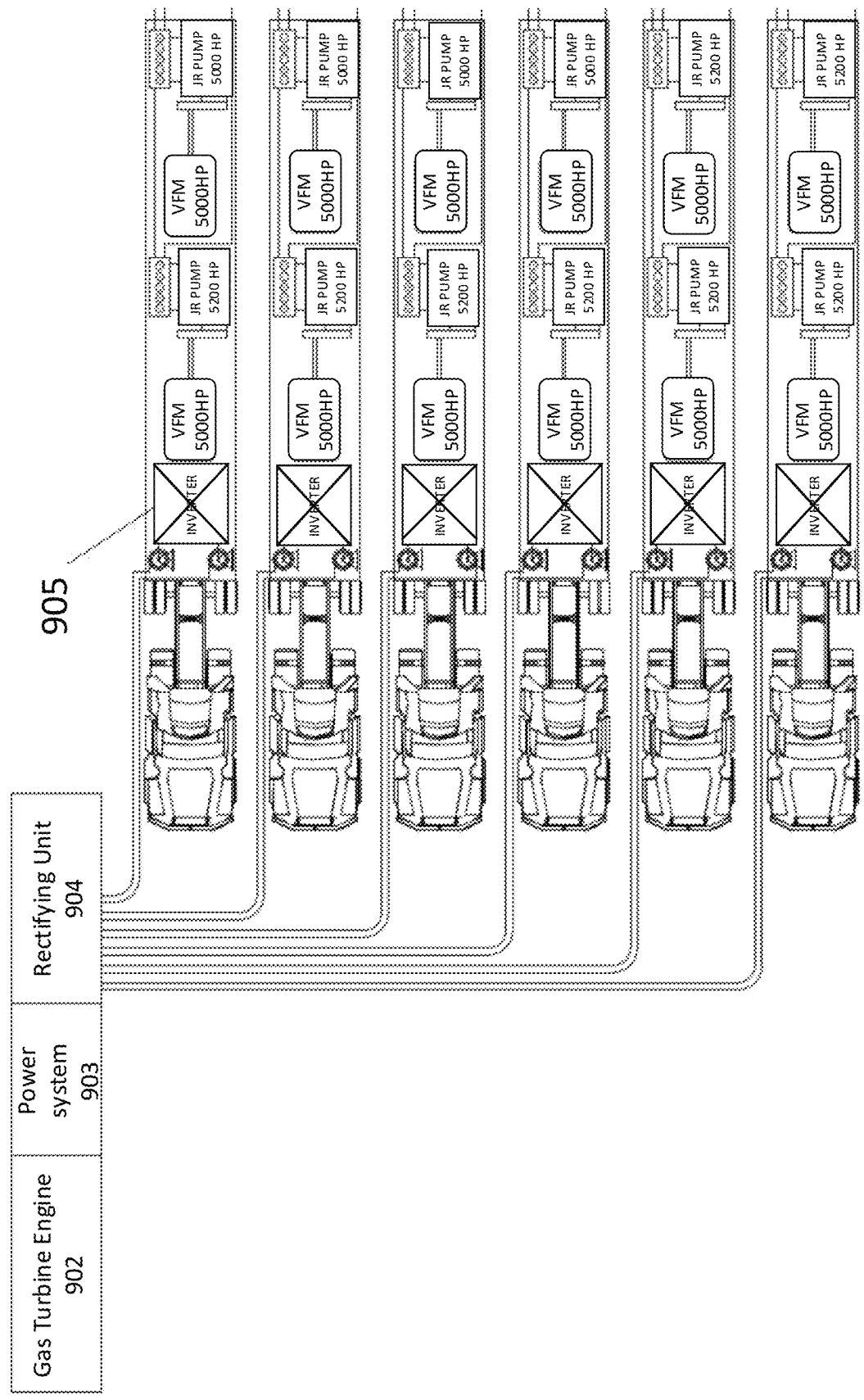
FIG. 18 is a schematic structural diagram of an electric drive fracturing equipment according to some embodiments of the present disclosure.
Figure 19:
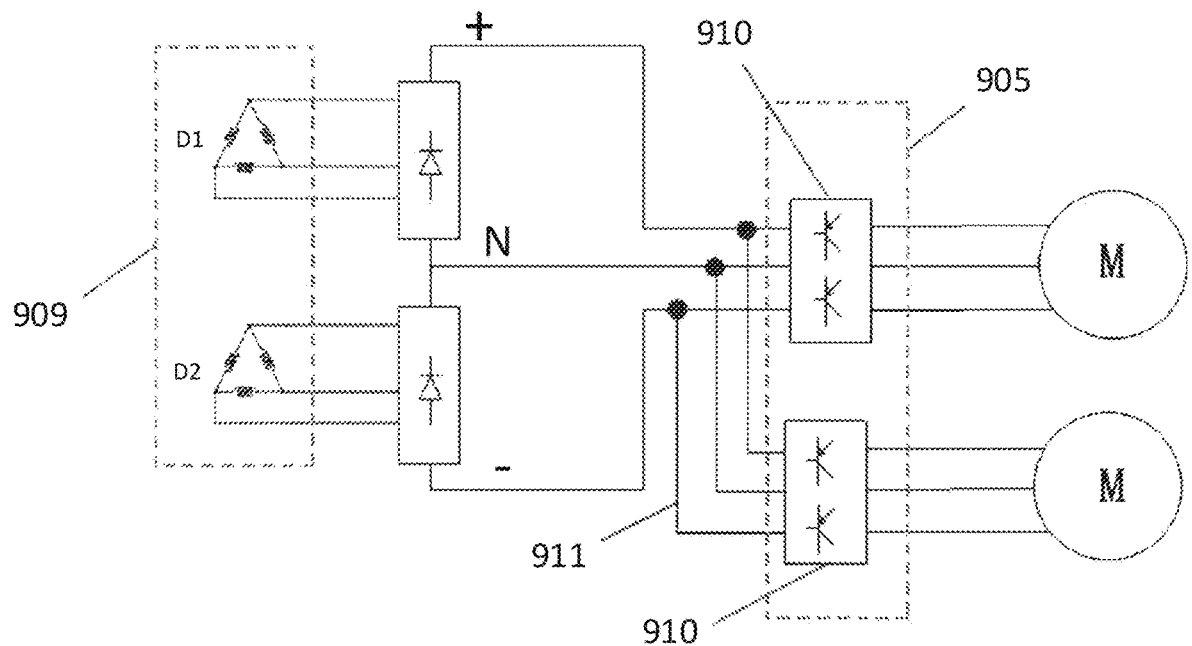
FIG. 19 is a schematic diagram of electrical connection of a generator in D-D configuration according to some embodiments of the present disclosure.
Figure 20:
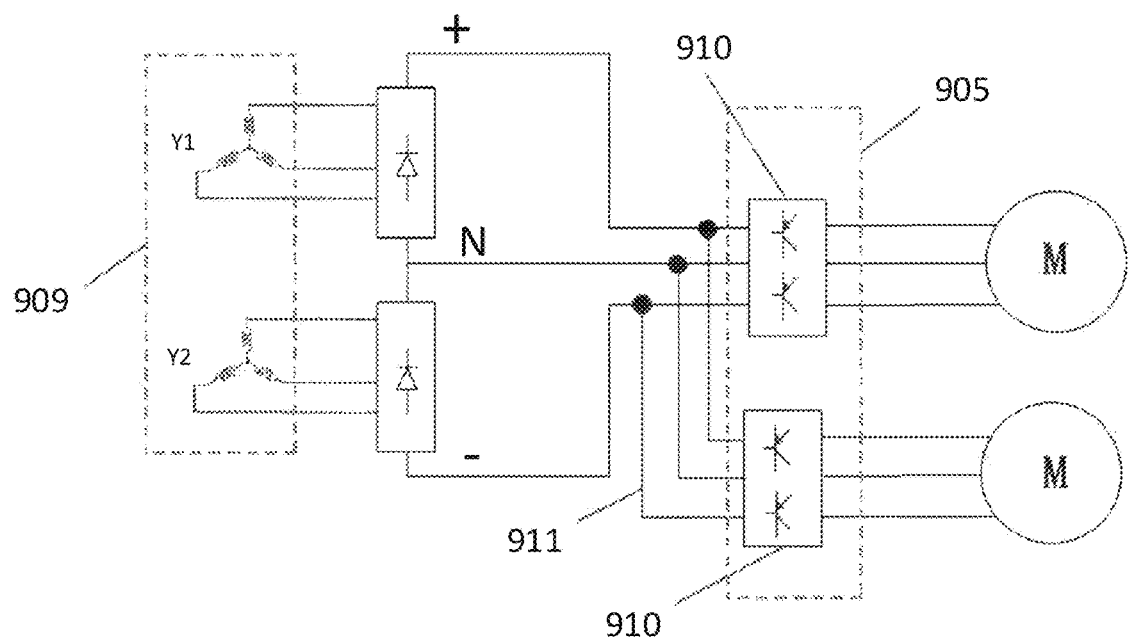
FIG. 20 is a schematic diagram of electrical connection of a generator in Y-Y configuration according to some embodiments of the present disclosure.

In some embodiments, as shown in FIGS. 17 to 18, a power supply semi-trailer for electric drive fracturing equipment includes a power supply platform 901, one gas turbine engine 902, one power system 903, one or more rectifiers (e.g., multiple sets of rectifying units 904), and one or more inverters (e.g., multiple sets of inversion units). The gas turbine engine 902, the power system 903, and the rectifying units 904 may be integrated on the power supply platform 901. The power system may include at least one of the following: a generator, an energy storage, and an electricity supplier. At least two of the following may be arranged on the power supply platform: the gas turbine engine, the power system, and the one or more rectifiers. The energy storage may include a battery, a switch, a charging interface, and an electric supply interface. The electricity supplier may include at least one of an electricity grid, photovoltaic electricity generating equipment, a wind power plant, and a fuel cell. The generator may include at least one of a diesel generator, a turbine generator, a gas generator, and a nuclear reactor generator. In one embodiment, one end of the power system 903 is connected to the gas turbine engine 902, and the other end of the power system 903 is connected to the rectifying units 904. The multiple sets of rectifying units 904 are arranged side by side. The inversion units are disposed on a gooseneck of the electric drive power supply platform. The rectifying units 904 are connected to the inversion units through a common DC bus. At least two of the following may be arranged on the power supply platform: the gas turbine engine, the power system, and the one or more rectifiers. The power system 903 may include a double-winding generator 910. The power system 903 is connected to the rectifying units 904 directly. The power supply semi-trailer is a power supply semi-trailer matched with the electric drive fracturing equipment, which may include a combination of a gas turbine engine 902, a power system 903 and a rectifying unit 904 integrated on a power supply platform 901. The power system 903 is connected to the rectifying unit 904 directly. This power supply mode directly obviate the rectifier transformer equipment in conventional power supply, making the volume of the power supply semi-trailer smaller. The rectifying units 904 are connected to the inversion units through a common DC bus, so that the common DC bus can separately drive multiple inversion units, thus decreasing the wirings of power supply lines, and simplifying the circuit connection, the wiring becoming easier.

In some embodiments, the inversion units disposed on a gooseneck of the electric drive power supply platform are high voltage inversion units 905. The high voltage inversion units 905 are disposed on a gooseneck of the electric drive power supply platform to optimize the spatial arrangement of equipment, so that the entire electric drive fracturing equipment has a compact structure, and occupies a small area.

In some embodiments, the phase difference of double winding of the power system 903 is 30°, the winding configuration is type Y-Y or type D-D. The alternating voltage output from the power system 903 ranges from 1600 VAC to 2300 VAC.

In some embodiments, the power of the power system 903 is at least 10 MVA, the frequency is 50-60 Hz or 100-120 Hz, and the voltages of the rectifying units 904 are 4000 VDC or above, and further the voltages of the rectifying units range from 4000 VDC to 6500 VDC, ensuring that the power supply semi-trailer has a high output power to drive a high-power electric drive fracturing semi-trailer.

In some embodiments, FIG. 18 is a schematic diagram of connection between the power supply semi-trailer and the high-power electric drive fracturing semi-trailer. The rectifying units 904 on the power supply platform 901 are connected to the inversion units disposed on the gooseneck of the electric drive power supply platform through a common DC bus. Each of the inversion units has a compartment structure provided with two three-level inverters. Each inverter can drive one electric motor to work independently. Electric motors are used to drive the plunger pump to work, providing a forceful guarantee for the power supply of the high-power electric drive equipment. The lubricating oil radiator is used to cool the lubricating oil in the plunger pump. An electrical control cabinet is used to implement local manipulation of the electric drive fracturing semi-trailer.

In some embodiments, the fracturing apparatus includes a plurality of sets of fracturing semi-trailers including a plurality of fracturing semi-trailer bodies respectively. The plurality of sets of inverters are on the fracturing semi-trailer bodies respectively. In one embodiment, each set of the inverters comprises two inverters, and the inverters are three-level inverters. In one embodiment, the inverters are high voltage inverters, and each of the plurality of sets of inverters is arranged on a gooseneck of one of sets of the fracturing semi-trailers. In one embodiment, the fracturing apparatus further includes an electric motor and a plunger on each of the fracturing semi-trailer bodies. Each of the inverters is connected to the electric motor and the electric motor is connected to a plunger pump.

FIG. 21 is a schematic diagram of a fracturing method 920 according to some embodiments of the present disclosure. The method 920 may include step 921 controlling an energy storage to supply electrical energy to fracturing equipment when power supply from an electricity supplier is cut off, wherein: the fracturing equipment comprises a power supply platform, a gas turbine engine, one or more rectifiers, and a power system comprising at least one of the following: a generator, the energy storage, and the electricity supplier; at least two of the gas turbine engine, the power system, and the one or more rectifiers are arranged on the power supply platform; a first end of the power system is connected to the gas turbine engine; a second end of the power system is connected to the one or more rectifiers; and the power system is configured to output a voltage to the one or more rectifiers directly without passing through a rectifier transformer; and include step 922 controlling the energy storage to charge a portion of batteries of the energy storage and supply electrical energy from a different portion of the batteries of the energy storage at the same time.

The directional phrases "top", "bottom", "front end", "back end", and the like used in the invention should be conceived as shown in the attached drawings, or may be changed in other ways, if desired.

In the drawings of the embodiments of the present disclosure, only the structures related to the embodiments of the present disclosure are involved, and other structures may refer to the common design(s). In case of no conflict, features in one embodiment or in different embodiments of the present disclosure may be combined.

The above are merely particular embodiments of the present disclosure but are not limitative to the scope of the present disclosure; any of those skilled familiar with the related arts can easily conceive variations and substitutions in the technical scopes disclosed in the present disclosure, which should be encompassed in protection scopes of the present disclosure. Therefore, the scopes of the present disclosure should be defined in the appended claims. Further, two or more of the embodiments described herein may be combined unless explicitly prevented.

The invention claimed is:

1. A fracturing system comprising a plunger pump, an electric motor, a gas turbine engine, a rectifier, and a generator; wherein:
the generator is driven by the gas turbine engine;
the generator is electrically connected to the rectifier without passing through a rectifier transformer;
the rectifier is electrically connected to the electric motor;
the plunger pump is driven by the electric motor.

2. The fracturing system of claim 1, further comprising an energy storage.

3. The fracturing system of claim 2, wherein the energy storage comprises a battery and a charging interface.

4. The fracturing system of claim 3, wherein the battery is a lithium ion battery, a sodium ion battery, or a lithium iron phosphate battery.

5. The fracturing system of claim 3, wherein the energy storage further comprises a DC/DC converter electrically connected between the battery and the charging interface.

6. The fracturing system of claim 2, wherein the energy storage is arranged on a carrier.

7. The fracturing system of claim 2, further comprising a switch cabinet, wherein the energy storage is electrically connected to the electric motor through the switch cabinet.

8. The fracturing system of claim 1, further comprising an electricity supply interface, wherein the electricity supply interface is configured to connect to an electricity grid.

9. The fracturing system of claim 1, further comprising an electricity supplier, wherein the electricity supplier is a diesel generator set, a turbine generator set, a gas generator set, a nuclear reactor generator set, photovoltaic electricity generating equipment, wind turbine electricity generating equipment, or a fuel cell.

10. The fracturing system of claim 1, further comprising an inverter, wherein the inverter is integrated with the electric motor.

11. A compact electrical power supply for fracturing equipment, comprising:
a carrier, a gas turbine engine, a rectifier, and a generator; wherein:
at least two of the gas turbine engine, the rectifier, and the generator are integrated on the carrier;
the generator is driven by the gas turbine engine;
the generator is electrically connected to the rectifier without passing through a rectifier transformer.

12. The compact electrical power supply of claim 11, wherein the carrier is an auxiliary lifting appliance, a semi-trailer, a trailer, a vehicle chassis, a vehicle, a rail vehicle, a truck, a base for lifting, or a skid.

13. The compact electrical power supply of claim 11, further comprising an energy storage.

14. The compact electrical power supply of claim 11, further comprising an electricity supply interface, wherein the electricity supply interface is configured to connect to an electricity grid.

15. The compact electrical power supply of claim 11, further comprising an electricity supplier, wherein the electricity supplier is a fuel cell.

16. The compact electrical power supply of claim 11, wherein the generator is a double-winding generator.

17. The compact electrical power supply of claim 16, wherein the double-winding generator has a phase difference of 30°.

18. The compact electrical power supply of claim 16, wherein the double-winding generator has a winding configuration of type Y-Y.

19. The compact electrical power supply of claim 16, wherein the double-winding generator has a winding configuration of type D-D.

20. The compact electrical power supply of claim 11, wherein the generator has a frequency of 50-60 Hz or 100-120 Hz.

\* \* \* \* \*